US012641672B2

(12) United States Patent (10) Patent No.: US 12,641,672 B2

Paladugu et al. (45) Date of Patent: May 26, 2026

(54) SYSTEM INFORMATION ACQUISITION IN SERVICE-BASED SYSTEMS

(71) Applicant: QUALCOMM Incorporated, San Diego, CA (US)

(72) Inventors: Karthika Paladugu, Hyderabad (IN); Ozcan Ozturk, San Diego, CA (US); Gavin Bernard Horn, La Jolla, CA (US); Aziz Gholmieh, Del Mar, CA (US)

( * ) Notice: Subject to any disclaimer, the term of this patent is extended or adjusted under 35 U.S.C. 154(b) by 324 days.

(21) Appl. No.: 18/470,108

(22) Filed: Sep. 19, 2023

(65) Prior Publication Data

US 2025/0098018 A1      Mar. 20, 2025

(51) Int. Cl.
H04W 76/27        (2018.01)
H04W 48/10        (2009.01)

(52) U.S. Cl.
CPC ........... H04W 76/27 (2018.02); H04W 48/10 (2013.01)

(58) Field of Classification Search
None
See application file for complete search history.

(56) References Cited

U.S. PATENT DOCUMENTS

2018/0092027 A1 * 3/2018 Sheng .................... H04W 48/08
2019/0268922 A1 8/2019 He et al.

2019/0349840 A1 11/2019 Zhang et al.
2019/0349841 A1 11/2019 Ishii
2021/0051569 A1 2/2021 Arjona et al.
2021/0289423 A1 9/2021 He
2022/0377648 A1 11/2022 Wang et al.
2024/0357574 A1 10/2024 Xiang et al.

FOREIGN PATENT DOCUMENTS

EP          3476157 B1      8/2022
EP          3491566 B1 *    9/2023    ............ H04W 48/14
WO    WO-2021134162 A1 *    7/2021    ............ H04W 76/20
WO    WO-2023124823 A1      7/2023

OTHER PUBLICATIONS

International Search Report and Written Opinion—PCT/US2024/042539—ISA/EPO—Nov. 27, 2024.
3GPP: "5G, NR, Radio Resource Control (RRC), Protocol Specification (3GPP TS 38.331 version 17.4.0 Release 17)", ETSI TS 138 331, V17.4.0, May 2023, pp. 1-1301.

* cited by examiner

*Primary Examiner* — Hong S Cho

(57)          ABSTRACT

This disclosure provides systems, methods, and devices for wireless communication that enhanced system information delivery schemes. In a first aspect, a method of wireless communication includes receiving, by a user equipment (UE), access system information (SI) from a network device; transmitting, by the UE, a service SI request based on the received access SI, the service SI request indicating a request for particular service SI data; and receiving, by the UE, the particular service SI data, the particular service SI data including one or more SI blocks (SIBs), scheduling information for the one or more SIBs, or both. Other aspects and features are also claimed and described.

30 Claims, 10 Drawing Sheets

300

301

ACCESS SI

501

500

SERVICE SI

601

602

600

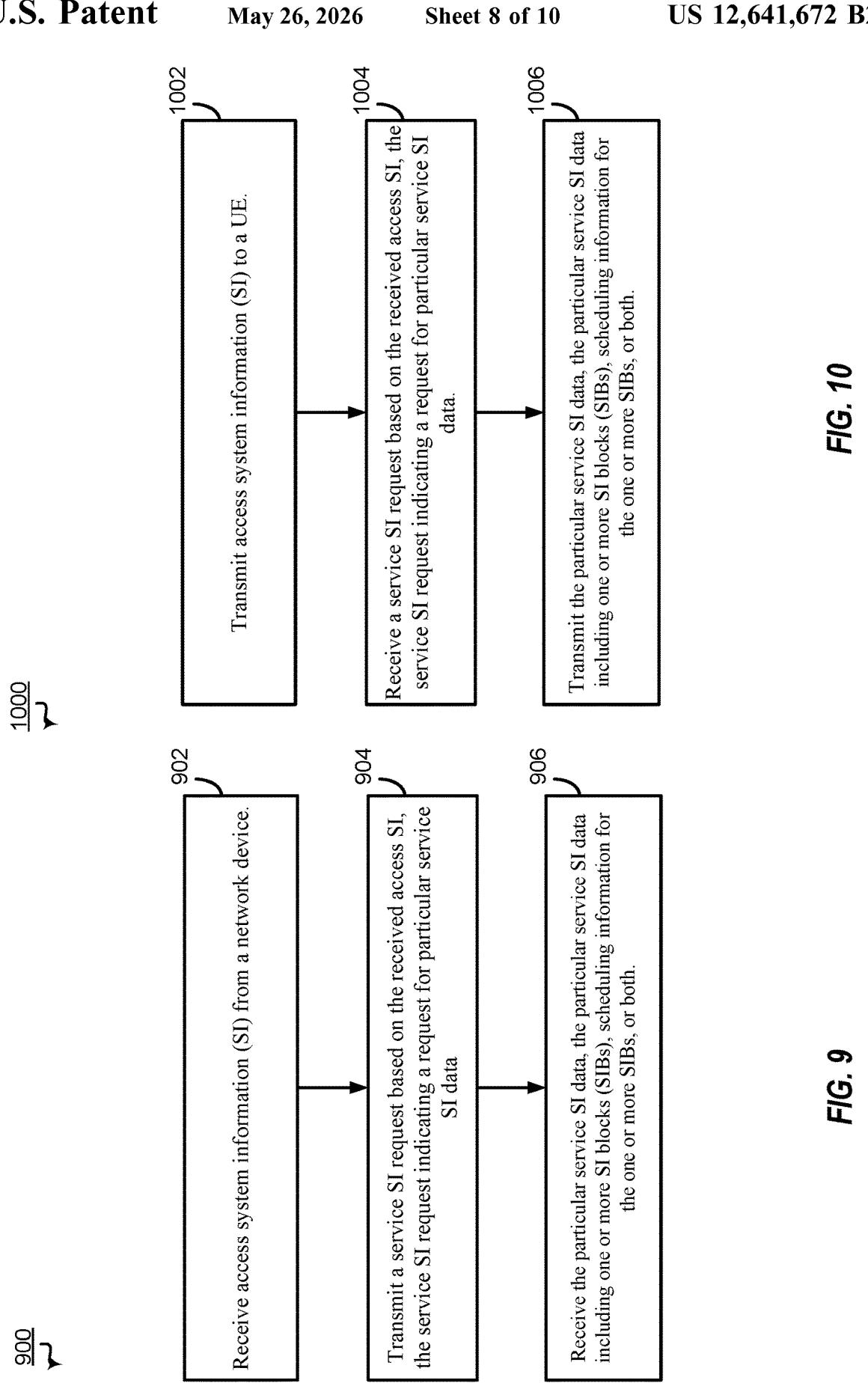

1000

1002 Transmit access system information (SI) to a UE.

1004 Receive a service SI request based on the received access SI, the service SI request indicating a request for particular service SI data.

1006 Transmit the particular service SI data, the particular service SI data including one or more SI blocks (SIBs), scheduling information for the one or more SIBs, or both.

902 Receive access system information (SI) from a network device.

904 Transmit a service SI request based on the received access SI, the the service SI request indicating a request for particular service SI data 906 Receive the particular service SI data, the particular service SI data including one or more SI blocks (SIBs), scheduling information for the one or more SIBs, or both.

FIG. 9

SYSTEM INFORMATION ACQUISITION IN SERVICE-BASED SYSTEMS

TECHNICAL FIELD

Aspects of the present disclosure relate generally to wireless communication systems, and more particularly, to system information acquisition. Some features may enable and provide improved communications, including enhanced flexibility in providing access and service system information.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grow with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), access system information (SI) from a network device;

transmitting, by the UE, a service SI request based on the received access SI, the service SI request indicating a request for particular service SI data; and receiving, by the UE, the particular service SI data, the particular service SI data including one or more SI blocks (SIBs), scheduling information for the one or more SIBs, or both.

In an additional aspect of the disclosure, an apparatus configured for wireless communication is disclosed. The apparatus includes at least one processor, and a memory coupled to the at least one processor. The at least one processor is configured to: receive access system information (SI) from a network device; transmit a service SI request based on the received access SI, the service SI request comprising a service SI download request and indicating a request for particular service SI data; and receive the particular service SI data, the particular service SI data including one or more SI blocks (SIBs), scheduling information for the one or more SIBs, or both.

In an additional aspect of the disclosure, an apparatus configured for wireless communication is disclosed. The apparatus includes: means for receiving access system information (SI) from a network device; means for transmitting a service SI request based on the received access SI, the service SI request indicating a request for particular service SI data; and means for receiving the particular service SI data, the particular service SI data including one or more SI blocks (SIBs), scheduling information for the one or more SIBs, or both.

In an additional aspect of the disclosure, a non-transitory computer-readable medium stores instructions that, when executed by a processor, cause the processor to perform operations of: receiving access system information (SI) from a network device; transmitting a service SI request based on the received access SI, the service SI request indicating a request for particular service SI data; and receiving the particular service SI data, the particular service SI data including one or more SI blocks (SIBs), scheduling information for the one or more SIBs, or both.

In an additional aspect of the disclosure, an apparatus configured for wireless communication is disclosed. The apparatus includes at least one processor, and a memory coupled to the at least one processor. The at least one processor is configured to: transmit access system information (SI) to a UE; receive a service SI request from the UE based on the transmission of the access SI, the service SI request comprising a service SI download request and indicating a request for particular service SI data; and transmit the service SI request to a network device, wherein transmission of the service SI request enables a service SI download of the particular service SI data for the UE, the particular service SI data including one or more SI blocks (SIBs), scheduling information for the one or more SIBs, or both.

In an additional aspect of the disclosure, an apparatus configured for wireless communication is disclosed. The apparatus includes at least one processor, and a memory coupled to the at least one processor. The at least one processor is configured to: transmit access system information (SI) to a UE; receive a service SI request from the UE based on the transmission of the access SI, the service SI request comprising a service SI download request and indicating a request for particular service SI data; and transmit the particular service SI data to the UE, the particular service SI data including one or more SI blocks (SIBs), scheduling information for the one or more SIBs, or both.

In an additional aspect of the disclosure, an apparatus configured for wireless communication is disclosed. The apparatus includes at least one processor, and a memory coupled to the at least one processor. The at least one processor is configured to receive a service SI request for a UE and from a network device, the service SI request comprising a service SI download request and indicating a request for particular service SI data; transmit the particular service SI data to the UE, the particular service SI data including one or more SI blocks (SIBs), scheduling information for the one or more SIBs, or both.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily include a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports enhanced SI delivery operations according to one or more aspects.

FIG. 10 is a flow diagram illustrating another example process that supports enhanced SI delivery operations according to one or more aspects.

Like reference numbers and designations in the various drawings indicate like elements.

DETAILED DESCRIPTION

Figure 1:
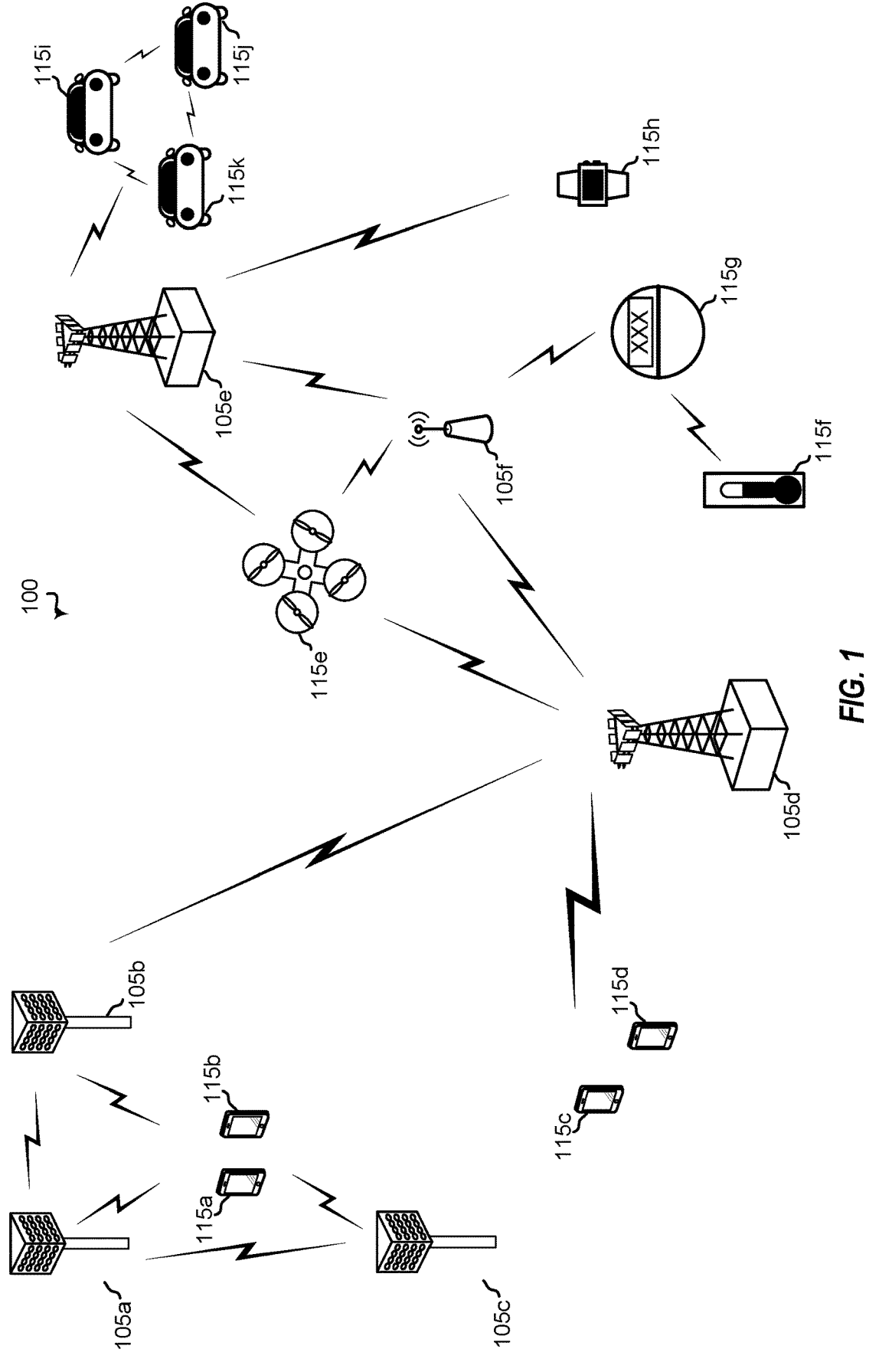
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aim to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHZ-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
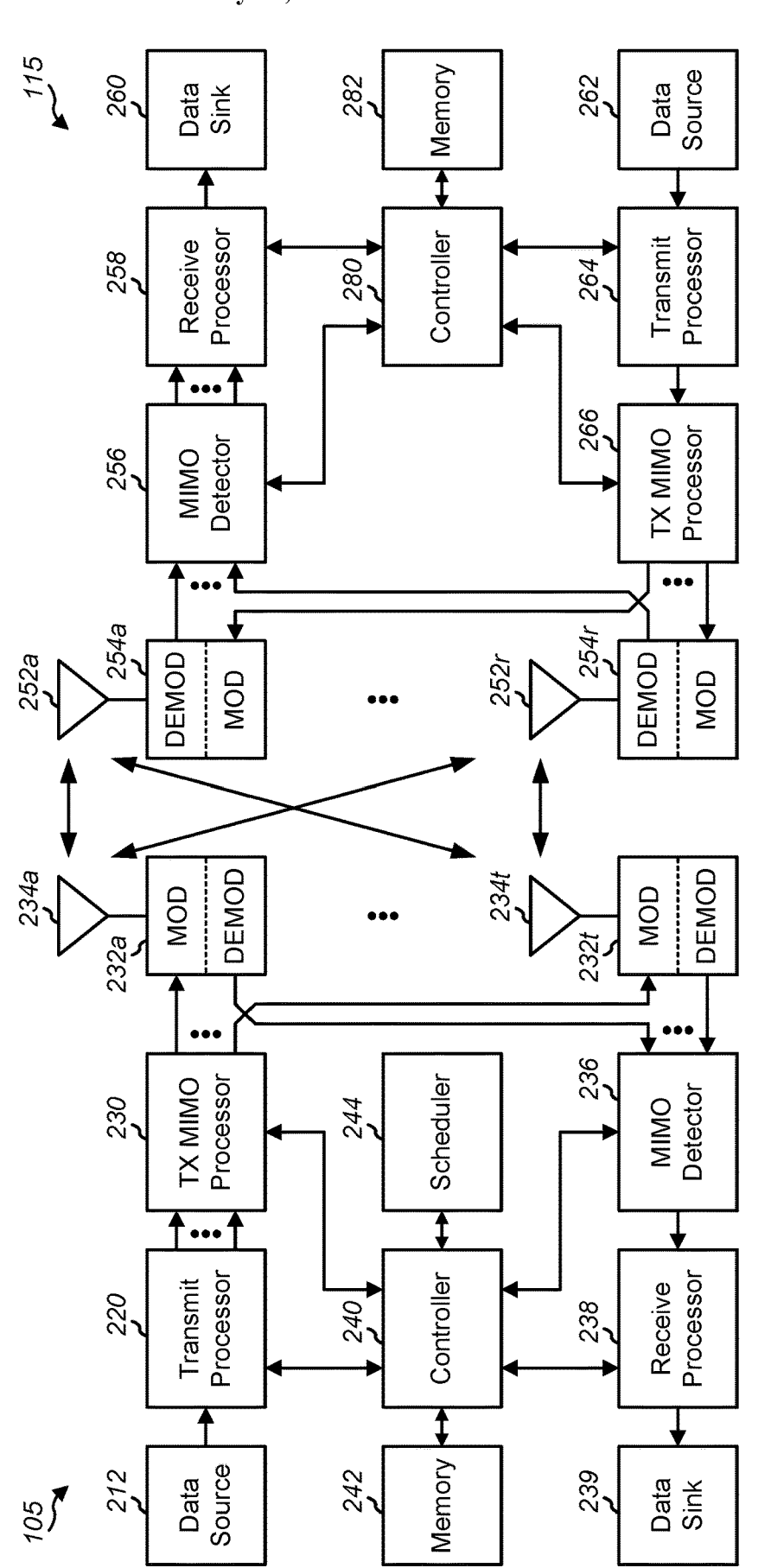
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

System information (SI) is needed to access and enable operation on wireless communication systems. In current wireless systems, such as fifth generation (5G) wireless systems, SI is provided in information block messages. For example, essential or connection access related information such as information to connect to the network and/or physical layer specifications or operating procedures, is provided in a master information block (MIB) and in a primary system information block (SIB1). Additional SI may be provided in other SIBS, such as SIB2-SIB21 and/or positioning SIBs (posSIBs), to enable further network functionality in connected modes. The MIB and SIBs are broadcast periodically by the network to enable UEs in connected modes to receive the messages and the SI therein.

Sixth generation (6G) wireless systems and other service-based wireless communication systems plan to use multiple types of SI, such as access SI and service SI, to enable core or base access and to also enable individual services. For example, SI for service-based systems may include access SI and service SI for operation and the provision of services. Access SI is mandatory and provides essential physical layer information of the cell, such as initial access information, cell barred status information, and service discovery information for obtaining service SI. Service SI provides information to support other additional or non-essential services (e.g., mobility, emergency, proximity, positioning, NTN access, SNPN, etc.). Even UEs in non-connected states, such as an RRC Idle state, may utilize access SI and some service SI to support non-connected mode services in 6G wireless systems.

Figures 3A, 3B:
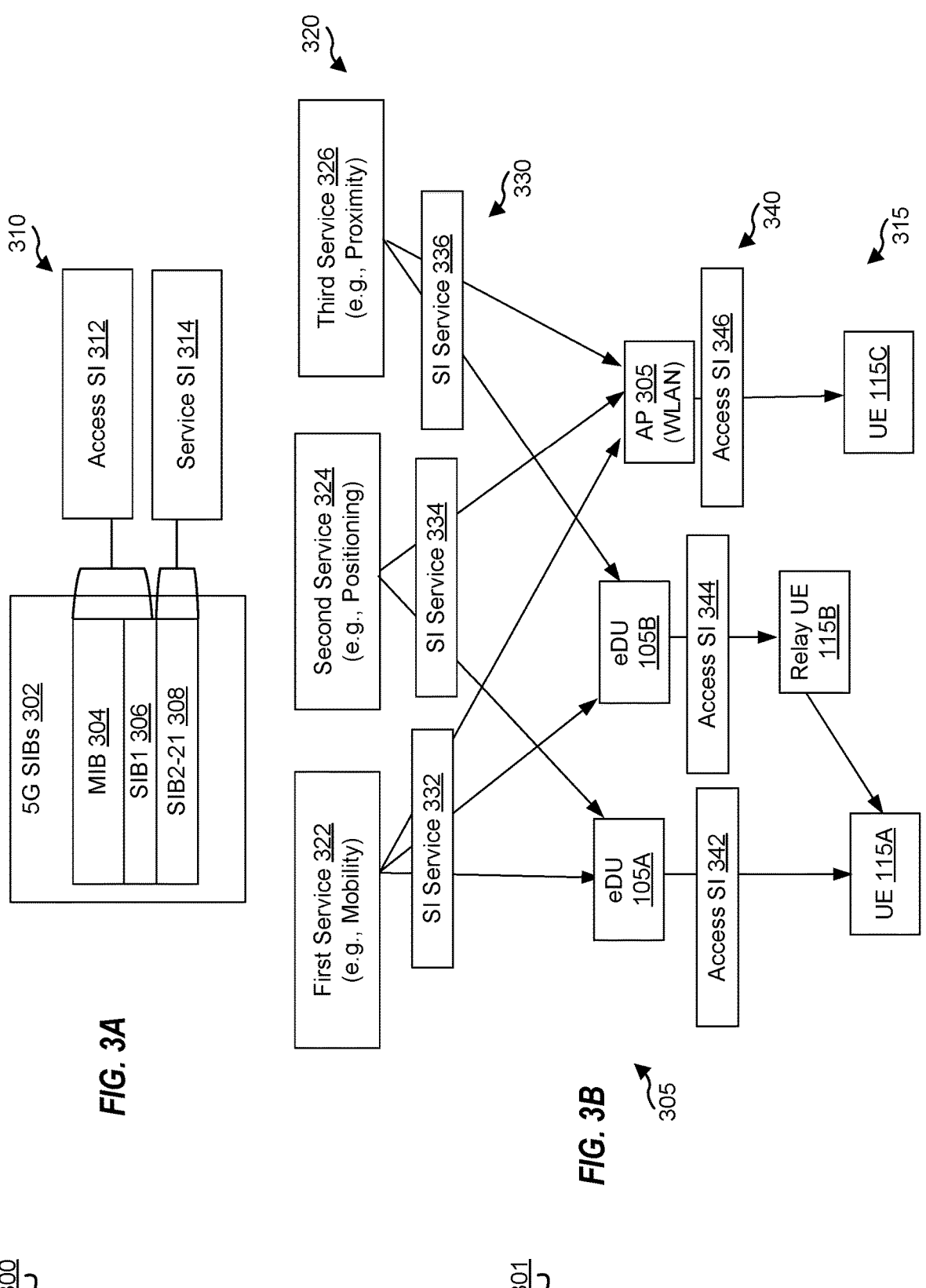
FIG. 3A is a block diagram illustrating access and service system information (SI) configurations.
FIG. 3B is a block diagram illustrating example configurations for the delivery of access SI and service SI.

Access SI and Service SI may correspond to information sent in physical layer messages, such as 5G SIBs or MIBs, or their 6G equivalent messages. As shown in the example of FIG. 3A and further described with reference to FIG. 3A, access SI may include or correspond to information provided in a master information block (MIB) and SIB1, and Service SI may include or correspond to information provided in other SIBS, such as SIB2-SIB21 and/or positioning SIBs (posSIBs). The SIB identifiers may have some level of standardization across different networks, but they also have support for proprietary extension in 6G and other service-based wireless communication systems.

An enhancement of this SI architecture (e.g., dual access and service SI) is that service SI can be delivered over any radio access technology (RAT), including for distributed or Open RAN systems. For example, as shown in FIG. 3B, multiple services can be provided to multiple UEs, where each UE may be connected to the service via a different path and RAT. To illustrate, a UE may be connected to a service via a direct connection (e.g., 6G connection via a base station, such as an enhanced distributed unit (eDU)) or may be connected to a service via an indirect connection. As examples of indirect connections, a UE may be connected to the service via a WLAN by an AP (e.g., Wi-Fi) or via another UE (e.g., a relay UE).

The eDU and/or AP support the service SI configuration and delivery. Additionally, access SI and service SI content delivery may change based on access/connection type. For example, when connecting via an indirect connection (e.g., WLAN/AP) partial access SI and/or RAT specific SI may be provided to a UE. An eDU may provide for access SI delivery, support for application programming interfaces (APIs) for service SI configuration by services, delivery of SI over the air as indicated by the services, periodic and/or dynamic (on-demand) SI support, and management of SI delivery mode (e.g., broadcast, multicast, unicast, etc.).

A service (or service entity) supports service operation and functionality and may be a separate entity from the eDU or a logical entity or function within the eDU. In some implementations, the service may provide SI configuration (SIBs, scheduling) to the eDU and provides for SI update procedures and operations, for which the eDU relays to the UEs. In other implementations, a separate entity, such as an SI service (or SI service entity), may provide the SI configuration for the SI, such as SI settings or configuration information, for one or more services (e.g., service entities). In some such implementations wherein the separate entity, a SI service is separate from the service, provides the SI configuration information, the separate entity may also be separate from the eDU or may integrated with the eDU.

Systems for providing access SI and service SI for sixth generation (6G) wireless systems or other service-based wireless communication systems are described herein. Access SI provides essential physical layer information of the cell, such as physical (PHY) layer information of the cell, initial access information, cell barred status information, service discovery information, or a combination thereof. Access SI may be provided in MIB and/or SIB1. The service discovery information may include mapping information for mapping a service or services to corresponding SIBs with information for the services. The service discovery information may enable the UE to obtain or receive the service SI.

Service SI may provide information to support service functions, such as service configuration and update for SIBs and the SIBs themselves. The SIBs themselves may include or correspond to the SI of 5G SIBs used to provide similar services, and the service configuration and update information may include or correspond to the scheduling of the SI (e.g., when and how the SIBs are sent). Service SI may correspond to information for all of the services or SIBs. Service SI may be provided in one or more system information messages, and each system information message may include one or more SIBs and corresponding configuration information. Service SI may include SI for secondary SIBs (e.g., SIB2-SIBn, positioning SIBs (posSIBs), etc.) to support additional or non-essential services, including services in idle modes. Service SI may include SIB scheduling configuration, SIB delivery type (broadcast or on-demand), SIB coverage information, SIB validity period information, or a combination thereof.

The SIB scheduling configuration (e.g., scheduling information) also referred to as scheduling or configuration information may include information for providing the service, information for maintaining or updating the service, or both. For example, the SIB information may include service identifier information (service ID), SI configuration information, SI update conditions, SI delivery conditions or methods (e.g., unicast or broadcast), SIB scheduling information (periodicity and/or location information), etc.

The SIB coverage information (e.g., area scope information) may indicate one or more cells and/or areas for which the service or SIB is provided or valid. The SIB coverage information may indicate one or more valid Cell IDs, one or more valid SI area IDs, etc. The SIB validity period information may indicate a duration or time period for which the service or SIB is valid or for which a piece of the information for the service or SIB is valid. For example, the SIBs or information thereof may have a value tag per SIB or item.

In the aspects disclosed herein, systems and methods for providing access and service SI are provided. An eDU may provide initial access SI to UEs via broadcast transmissions, unicast transmissions, or both, as described with reference to FIGS. 5A and 5B. For example, the eDU may periodically broadcast the access SI (e.g., information in MIB and SIB1) to UEs in both Idle and Connected states (RRC IDLE and RRC CONNECTED) in an access SI message. Additionally, or alternatively, the eDU may transmit the access SI in a unicast transmission directly to a UE responsive to a request by the UE. In other implementations, the eDU may broadcast access SI responsive to a UE request.

The eDU may further enable service SI acquisition after a UE acquires the access SI. In some implementations, the UE may transition to a connected state to receive service SI. The eDU may provide service SI to UEs in multiple different ways, by SI download, on-demand, or by broadcast, as described with reference to FIGS. 6A-6C. Similar to the above, the eDU may broadcast service SI (e.g., for all services or select services, such as SIB2, SIB4, SIB5, etc.) periodically in SI messages for UEs in connected and idle states. The eDU may also be configured to respond to specific SI request (e.g., on-demand request) from UEs in idle states, connected states, or both. The eDU may then transmit the requested SI in a unicast manner.

For SI download, a UE in a connected state may request a download of service SI from the eDU for a service which is separate and/or distinct from the eDU. The eDU may facilitate the transfer of service SI (e.g., SI download) by relaying the request to a SI service (service that provides service SI for multiple services), and the UE acquires the SI from the SI service. The download operations can be used for initial service SI acquisition or updates.

After initial service SI acquisition, service SI may be periodically updated. For example, service SI may be associated with a duration (valid for a given time period), and a UE may periodically retrieve valid (e.g., updated or modified) service SI. An example of a service SI update is provided in the below image. In this example, the service is integrated with the SI service from the above example. The integrated service and SI service may also be integrated with the eDU or separate from the eDU. In the below example, the service provides an update to the eDU which is then sent or relayed to the UEs. This SI update may be broadcast to all UEs, sent in unicast to affected UEs, or transmitted in response to a specific request from the UE, which is not shown. Similar to the initial service SI, the service SI may include information for one or more services (e.g., one or more SIBS, SIB2, SIB4, etc.) and the corresponding scheduling information for the one or more services (e.g., configuration information for SIB2, SIB4, etc.).

After initial access SI acquisition, access SI may be periodically updated. For example, access SI may be associated with a duration (valid for a given time period), and a UE may periodically retrieve valid (e.g., updated) access SI. Additionally, or alternatively, a UE may request different or updated access SI as its connection method (e.g., direct or indirect) and/or connection status (e.g., connected or idle) changes.

Although the examples used herein are described with reference to an eDU, another type of base station or network device may be used in other examples. To illustrate, a gNB or other type of base station or an access point may provide the access and service SI. Additionally, the access and service SI may be relayed to a UE via another UE (relay UE) when the UE is out of coverage. Accordingly, the aspects described herein enable enhanced SI delivery schemes to enable a network to provide UEs with access and service SI via a plurality of ways.

Referring to FIG. 3A, FIG. 3A illustrates a block diagram 300 of an example of system information (SI) 310 for service-based wireless networks, such as for use in sixth generation (6G) wireless systems. The SI 310 for service-based wireless networks may include access SI 312 and service SI 314.

In FIG. 3A, SI for conventional or non-service-based networks, such as 5G SI, is also illustrated. Specifically, FIG. 3A depicts 5G SIBs 302, which include a MIB 304, a first or primary SIB, SIB 306 (SIB1), and one or more second or secondary SIBs, SIBs 308 (SIB2-21). As shown in the example of FIG. 3A, the access SI 312 for service-based networks may include or correspond to information provided in a master information block (MIB) and SIB1, and service SI 314 for service-based networks may include or correspond to information provided in other SIBS, such as SIB2-SIB21 and/or positioning SIBs (posSIBs).

Referring to FIG. 3B, FIG. 3B illustrates an example of SI for service-based wireless networks, such as for use in 6G wireless systems. FIG. 3B depicts different connection types and flexible service-based network architecture for the provision of services to multiple devices.

In FIG. 3B, the service-based wireless network 301 includes a plurality of network devices or nodes, such as a first base station 105A, a second base station 105B, an access point (AP) 305. The service-based wireless network 301 also includes a plurality of UEs 315, such as a first UE 115A, a second UE 115B, a third UE 115C. Each UE of the plurality of UEs 315 may be connected to one or more network devices or nodes. For example, the first UE 115A is connected to the first base station 105A, the second UE 115B is connected to the second base station 105B, and the third UE 115C is connected to the AP 305.

In some implementations, a UE may be connected to more than one node. Additionally, or alternatively, a UE may connect to a network node via another network node or another UE. To illustrate, the first UE 115A may be connected to the second base station 105B via the second UE 115B, and the second UE 115B (e.g., relay UE) may relay information, such as SI or data for services, to the first UE 115A. This may enable the first UE 115A to access services offered by the second base station 105B in addition to services of the first base station 105A. However, the first UE 115A may use additional or different SI to access and utilize the services associated with and/or offered via the second base station 105B.

The service-based wireless network 301 further includes a plurality of services 320 (e.g., SI services or service entities) and a plurality of SI services 330 provided by the plurality of services 320. For example, the plurality of services 320 may include a first service 322, a second service 324, and a third service 326. The first service 322 may include or correspond to a mobility service entity that provides a mobility service (e.g., first SI service 332). The second service 324 may include or correspond to a positioning service entity that provides a positioning service (e.g., second SI service 334), and the third service 326 may include or correspond to a proximity service entity that provides a proximity service (e.g., third SI service 336).

For example, the plurality of SI services 330 may include a first SI service 332, a second SI service 334, and a third SI service 336. The first SI service 332 may include or correspond to a mobility service. The second SI service 334 may include or correspond to a positioning service, and the third SI service 336 may include or correspond to a proximity service. Each of the SI services 330 may be associated with service SI.

Each service of the plurality of services 320 may be associated with one or more network nodes and provide a corresponding SI service or services to one or more UEs. For example, the first service 322 is associated with each of the network nodes, the second service 324 is associated with the first base station 105A and the AP 305, and the third service 326 is associated with the second base station 105B and the AP 305. The first service 322 may provide services (e.g., the first SI service 332) to each of the UEs 315 via one or more of the network nodes (such as via a corresponding network node), the second service 324 may provide services (e.g., the second SI service 334) to the first UE 115A and the third UE 115C via the first base station 105A and the AP 305, and the third service 326 may provide services (e.g., the third SI service 336) to the second UE 115B and the third UE 115C via the second base station 105B and the AP 305.

The service-based wireless network 301 includes different SI, referred to as a plurality of SI 340, such as a first access SI 342, second access SI 344, third access SI 346. Additionally, the plurality of SI 340 may include different types of SI, such as access SI and service SI. For examples, the plurality of SI 340 may include different service SI, referred to as a plurality of service SI, such as service SI for each service of the plurality of services 320 or each SI service of the plurality of SI services 330, and optionally service SI for one or more services hosted by the plurality network devices or nodes. The access SI 342-346 may enable the UEs 315 to connect to one or more of the network nodes, and the service SI may enable the UEs 315 to connect to one or more of the services 320 and receive the SI services 330.

In the example of FIG. 3B, the first and second access SI 342 and 344 may include or correspond to access SI for a service-based base station or 6G base station. The third access SI 346 may include or correspond to RAT specific access SI to enable connection to cellular, service based, or 6G services via an access point of a WLAN network, AP 305. In the example of FIG. 3B, the services 320 and/or SI services 330 may include or have corresponding service SI.

During operation, the UEs 315 may connect to the network nodes (e.g., eDU 105A, eDU 105B, AP 305) and receive SI (access SI and service SI) of the SI 340 to engage in network operations. Specific examples and schemes for the delivery of access SI and service SI are described further with reference to FIGS. 4-8.

In the aspects described herein, enhanced delivery schemes for SI enable more flexible operation and configurations in service-based networks to provide additional connection paths for devices of the networks and additional services via the connection paths. In some aspects, enhanced service SI download operations are described. The enhanced service SI download operations may enable a network or service to provide service SI to a device on-demand for one or more services, and/or to provide updates to the service SI. Such operations may enable services to be provided in an efficient manner with reduced network overhead and signaling.

Figure 4:
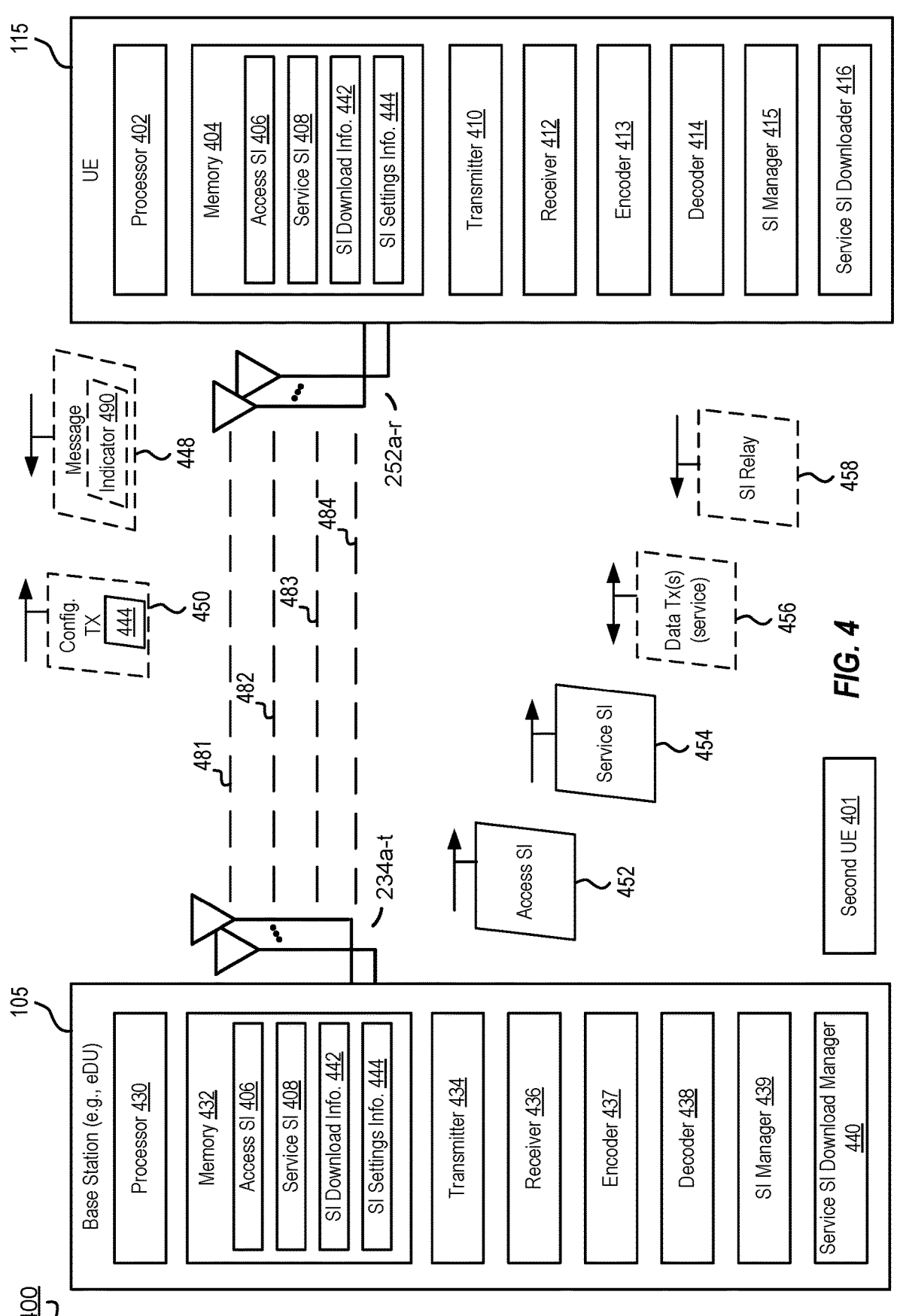
FIG. 4 is a block diagram illustrating an example wireless communication system that supports enhanced SI delivery schemes according to one or more aspects.

FIG. 4 illustrates an example of a wireless communications system 400 that supports enhanced SI delivery schemes, including enhanced service SI download operations in accordance with aspects of the present disclosure. In some examples, wireless communications system 400 may implement aspects of wireless network 100 of FIG. 1. For example, wireless communications system 400 may include a network (e.g., a service-based wireless network). The network may include one or more devices or nodes, such as one or more network entities, and one or more UEs, such as UE 115. As illustrated in the example of FIG. 4, the network entity includes or corresponds to a base station, such as base station 105 (e.g., eDU). Alternatively, the network entity may include or correspond to a different network device (e.g., AP 305). Enhanced SI delivery schemes may reduce network overhead in providing SI and updating SI, and may enable additional and flexible access to and configuration of services for service-based networks. Accordingly, network and device performance can be increased.

Base station 105 and UE 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. Base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, or a Bandwidth Part (BWP) ID. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management or BWP switching functionality. In some implementations, two or more CCs are quasi co-located, such that the CCs have the same beam and/or same symbol.

In some implementations, control information may be communicated via base station 105 and UE 115. For example, the control information may be communicated suing MAC-CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can include processor 402, memory 404, transmitter 410, receiver 412, encoder 413, decoder 414, SI manager 415, service SI downloader 416, and antennas 252*a-r*. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store access SI information 406, service SI information 408, SI download information 442, SI settings information 444, or a combination thereof, as further described herein. SI information as used herein may include or correspond to information or data which indicates the SI (system information), i.e., information or data which indicates the access SI or the service SI. This SI information may include to SI information or data which is stored in a memory. For brevity, SI information may be referred to as simply SI, such as access SI or service SI.

The access SI information 406 includes or corresponds to data associated with or corresponding to RAT access. For example, the access SI information 406 may include or correspond to mandatory or minimum SI required to utilize a network and the basic or essential services thereof. The access SI information 406 may include essential physical layer information of the cell, initial access information, cell barred status information, service discovery information, service SI discovery information.

In some implementations, the access SI information 406 includes different type of access SI, such as direct connection access SI information, indirect connection access SI information, 5G access SI information, 6G access SI information, WLAN access SI information, etc. In some such implementations, the different types of access SI of the access SI information 406 may correspond to a particular RAT and/or connection type thereof.

Additionally, or alternatively, the access SI information 406 includes or corresponds to information of MIB transmissions and/or SIB transmissions, such as SIB1. The access SI information 406 may include original access SI information, updated access SI information, or both. The access SI information 406 may be cell or area specific.

The service SI information 408 includes or corresponds to data associated with or corresponding to services offered by the network, such as base stations and/or services (e.g., service entities) thereof. For example, the service SI information 408 may include scheduling/timing information, area information, validity information, or a combination thereof, for one or more services. To illustrate, the service SI information 408 may include SIB scheduling information, SIB area information, SIB validity information, or a combination thereof, for one or more SIBs.

The timing or scheduling information (e.g., SIB timing/scheduling information) may include or correspond to scheduling configurations (broadcast or on-demand) and scheduling timing or windows for the services or SIBs.

The area or SIB area information may include or correspond to service or SIB area scope information (suitable Cell IDs, SI area IDs).

The validity or validity area information may include or correspond to a validity period of value, such as validity value tag per service or SIB.

In some implementations, the service SI information 408 includes or corresponds to information of additional SIB transmissions, such as SIB2-21 and/or positioning SIBs (posSIBs). For example, the service SI information 408 may include SIBs to support other services (e.g., mobility, emergency, proximity, positioning, NTN access, SNPN, etc.).

In some implementations, the service SI information 408 may be cell or area specific. The service SI information 408 may include original service SI information, updated service SI information, or both. The service SI information 408 may be provided via a download delivery scheme and may include or correspond to service SI download information.

The access SI information 406, the service SI information 408, or both may include information for relay UE support. For example, the access SI information 406, the service SI information 408, or both may include data for providing access or a service from one UE to another UE to extend a coverage range of device or service.

The SI download information 442 includes or corresponds to data associated with or corresponding to SI download operations. For example, the SI download information 442 may include or correspond to information used to determine one or more of: whether SI download operations are supported, whether to perform a SI download operation, when and how to perform the SI download operation, which SI download operation mode to use, which type of SI to download, or whether SI download information should be updated. To illustrate, the SI download information 442 may indicate SI download timing information, SI download access type, such as relay via base station or direct from the service using an API. In some implementations, the SI download information 442 indicates initial service or SIB information for new services or SIBs or updated service or SIB information for existing services or SIBs.

The SI settings information 444 includes or corresponds to data associated with enhanced SI delivery operations. The SI settings information 444 may include one or more types of enhanced SI delivery operation modes and/or thresholds or conditions for switching between enhanced SI delivery operation modes and/or configurations thereof. For example, the SI settings information 444 may have data indicating different thresholds and/or conditions for different SI delivery operation modes, direct connection mode, indirect connection mode, connected modes, inactive modes, idle modes, etc., or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410 or receiver 412 may include or correspond to one or more components of UE 115 described with reference to FIG. 2.

Encoder 413 and decoder 414 may be configured to encode and decode data for transmission. SI manager 415 may be configured to perform enhanced SI delivery operations. For example, SI manager 415 may be configured to perform one or more enhanced SI delivery operations, such as one or more of the operations of FIGS. 4-8. The enhanced SI delivery operations may include unicast operations, broadcast operations, groupcast operations, download and/or API operations, etc. The SI manager 415 may be configured to perform SI acquisition configuration, SI download request, and service SI download communication operations. To illustrate, the SI manager 415 may be configured to obtain the access SI information 406 and the service SI information 408. Additionally, the SI manager 415 may be configured to obtain the SI download information 442 and the SI settings information 444.

Service SI downloader 416 may be configured to perform service SI download operations, such as service SI download configuration, service SI download request, and service SI download communication operations. For example, the service SI downloader 416 may be configured to receive the service SI information 408 based on the access SI information 406, such as one or more of the operations of FIGS. 6A, 7, and 8.

Although one UE is shown in the example of FIG. 4, in other implementations the network may include additional UEs. The other UE or UEs may include one or more elements similar to UE 115. In some implementations, the UE 115 and the other UE or UEs are different types of UEs. For example, either UE may be a higher quality or have different operating constraints. To illustrate, one of the UEs may have a larger form factor or be a current generation device, and thus have more advanced capabilities and/or reduced battery constraints, higher processing constraints, etc.

Base station 105 includes processor 430, memory 432, transmitter 434, receiver 436, encoder 437, decoder 438, SI manager 439, service SI download manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store access SI information 406, service SI information 408, SI download information 442, SI settings information 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs and/or base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434 or receiver 436 may include or correspond to one or more components of base station 105 described with reference to FIG. 2.

Encoder 437 and decoder 438 may include the same functionality as described with reference to encoder 413 and decoder 414, respectively. SI manager 439 may be configured to perform enhanced SI delivery operations. For example, SI manager 439 may be similar to SI manager 415 and configured to perform one or more enhanced SI delivery operations as described with reference to SI manager 415.

Service SI download manager 440 may be configured to perform service SI download operations. For example, the service SI download manager 440 may be similar to service SI downloader 416 and configured to perform one or more enhanced service SI download operations as described with reference to service SI downloader 416. The service SI download manager 440 may be configured to perform SI download operations as described in FIGS. 6A, 7, and 8.

During operation of wireless communications system 400, the network (e.g., base station 105) may determine that UE 115 has service-based network capability and/or enhanced or flexible SI delivery schemes. For example, UE 115 may transmit a message 448 that includes an enhanced SI delivery indicator 490 (e.g., a SI download capability indicator). Indicator 490 may indicate SI download capability, such as service SI download capability, for one or more connection statuses, such as connected, idle, inactive, etc., or connection types, such as direct, indirect, cellular, WLAN, etc. In some implementations, a network entity (e.g., a base station 105 or AP 305) sends control information to indicate to UE 115 that service-based network operation and/or a particular type of SI delivery operation is to be used. For example, in some implementations, configuration transmission 450 is transmitted to the UE 115. The configuration transmission 450 may include or indicate to use a particular type of SI delivery or SI delivery scheme, or to adjust or implement a setting of a particular type of SI delivery or SI delivery scheme. For example, the configuration transmission 450 may include the SI settings information 444, as illustrated in the example of FIG. 4. In other implementations, the configuration transmission 450 may not include the SI settings information 444, may include additional information, such as SI download information 442, or any combination thereof.

During operation, devices of wireless communications system 400 perform enhanced SI delivery operations. For example, the network and UEs may exchange transmissions over the communication links to provide access SI and service SI, as illustrated in the example of FIG. 4.

In the example of FIG. 4, the base station 105 transmits an access SI transmission 452 to the UE 115 including the access SI information 406. The base station 105, such as the SI manager 439 thereof, may generate a transmission including or indicating the access SI information 406. For example, the base station 105 may generate access SI initial information or access SI update information of the access SI transmission 452 based on or including the access SI information 406 and transmit the access SI transmission 452 to one or more UEs, including the UE 115. To illustrate, the base station 105 may broadcast the access SI transmission 452. In some implementations, the access SI transmission 452 is a control channel transmission. In other implementations, the access SI transmission 452 includes or corresponds to a data transmission. The access SI transmission 452 may include or correspond to a broadcast message, a RRC message, a DCI transmission, a PDCCH, a PDSCH, a PSCCH, a PSSCH, a SCI, a SL-MAC-CE, a SL-RRC message, or an API message. Additional examples of and details on access SI acquisition are described further with reference to FIGS. 5A, 5B, 7, and 8.

The UE 115 receives the access SI transmission 452, including the access SI information 406. The UE 115 may access the network, such as base station 105 based on the access SI information 406. Additionally, the UE 115 may determine to receive service SI information 408 based on the access SI information 406, the SI download information 442, and/or the SI settings information 444. For example, the UE 115 may determine what service SI to receive, how to receive the service SI, and when to receive the service SI. In addition, the UE 115 may determine to receive updated access SI based on the access SI information 406, the SI download information 442, and/or the SI settings information 444. For example, the UE 115 may determine what updated service SI to receive, how to receive the updated service SI, and when to receive the updated service SI.

The base station 105 transmits a service SI transmission 454 to the UE 115 including the service SI information 408. The base station 105, such as the SI manager 439 thereof, may generate a transmission including or indicating the service SI information 408. For example, the base station 105 may generate service SI initial information or service SI update information of the service SI transmission 454 based on or including the service SI information 408 and transmit the service SI transmission 454 to one or more UEs, including the UE 115. To illustrate, the base station 105 may broadcast the service SI transmission 454 or transmit the service SI transmission 454 responsive to a download request. In some implementations, the service SI transmission 454 is a control channel transmission. In other implementations, the service SI transmission 454 includes or corresponds to a data transmission. The service SI transmission 454 may include or correspond to a broadcast message, a RRC message, a DCI transmission, a PDCCH, a PDSCH, a PSCCH, a PSSCH, a SCI, a SL-MAC-CE, a SL-RRC message, or an API message. Additional examples of and details on service SI acquisition are described further with reference to FIGS. 6A, 6B, 6C, 7, and 8.

In some implementations, the service SI information 408 includes or corresponds to downloaded service SI (e.g., service SI download information). For example, the service SI information 408 may include service SI download information which may be transmitted in a transparent container or by API.

The UE 115 receives the service SI transmission 454, including the service SI information 408. The UE 115 may access services of the network, such as service of the base station 105 or services associated with the base station 105 based on the service SI information 408. For example, the UE 115 may transmit and receive one or more data transmissions 456 based on the service SI information 408. To illustrate, the UE 115 may transmit a data transmission of the one or more data transmissions 456 to the base station 105 or to a service associated with the base station 105, such as a service of the SI services 330 of FIG. 3B. Additionally, or alternatively, the UE 115 may receive a data transmission of the one or more data transmissions 456 from the base station 105 or from a service associated with the base station 105.

Additionally, the UE 115 may determine to receive updated service SI based on the access SI information 406, the service SI information 408, the SI download information 442, and/or the SI settings information 444. For example, the UE 115 may determine what updated service SI to receive, how to receive the updated service SI, and when to receive the updated service SI. The UE 115 may receive the updated service SI in a manner similar to reception of the service SI information 408 in the service SI transmission 454, or in a different manner. For example, the UE 115 may receive the service SI information 408 in the service SI transmission 454 via download and may also receive the service SI update via download or may receive the service SI update unicast or broadcast. Examples of different service SI schemes are illustrated with reference to FIGS. 6A-6C, and FIG. 8 illustrates SI update operations.

In some implementations, the UE 115 is associated with another UE, such as relay UE or remote UE. In some such implementations, where the UE 115 is a relay UE, the UE may transmit a portion or all of the received access SI, the received service SI, or both to the other remote UE for the remote UE to connect to network (e.g., base station 105) and services via the UE 115. In other such implementations, where the UE 115 is a remote UE, the UE 115 may receive a portion or all of the received access SI, the received service SI, or both, from the other relay UE to connect to network (e.g., base station 105) and services via the other, relay UE. As illustrated in the example of FIG. 4, the UEs, UE 115 and second UE 401 may exchange SI via an SI relay transmission 458.

Accordingly, the network (e.g., the base station 105 and the UE 115) may be able to more flexibly and efficiently provide SI to users of the network, which may lead to better network operations and extension of network access and services to additional devices. Accordingly, the network performance and experience may be increased due to reductions in overhead for providing SI and in the increased access flexibility and provision of services.

Figures 5A, 5B, 6A, 6B, 6C:
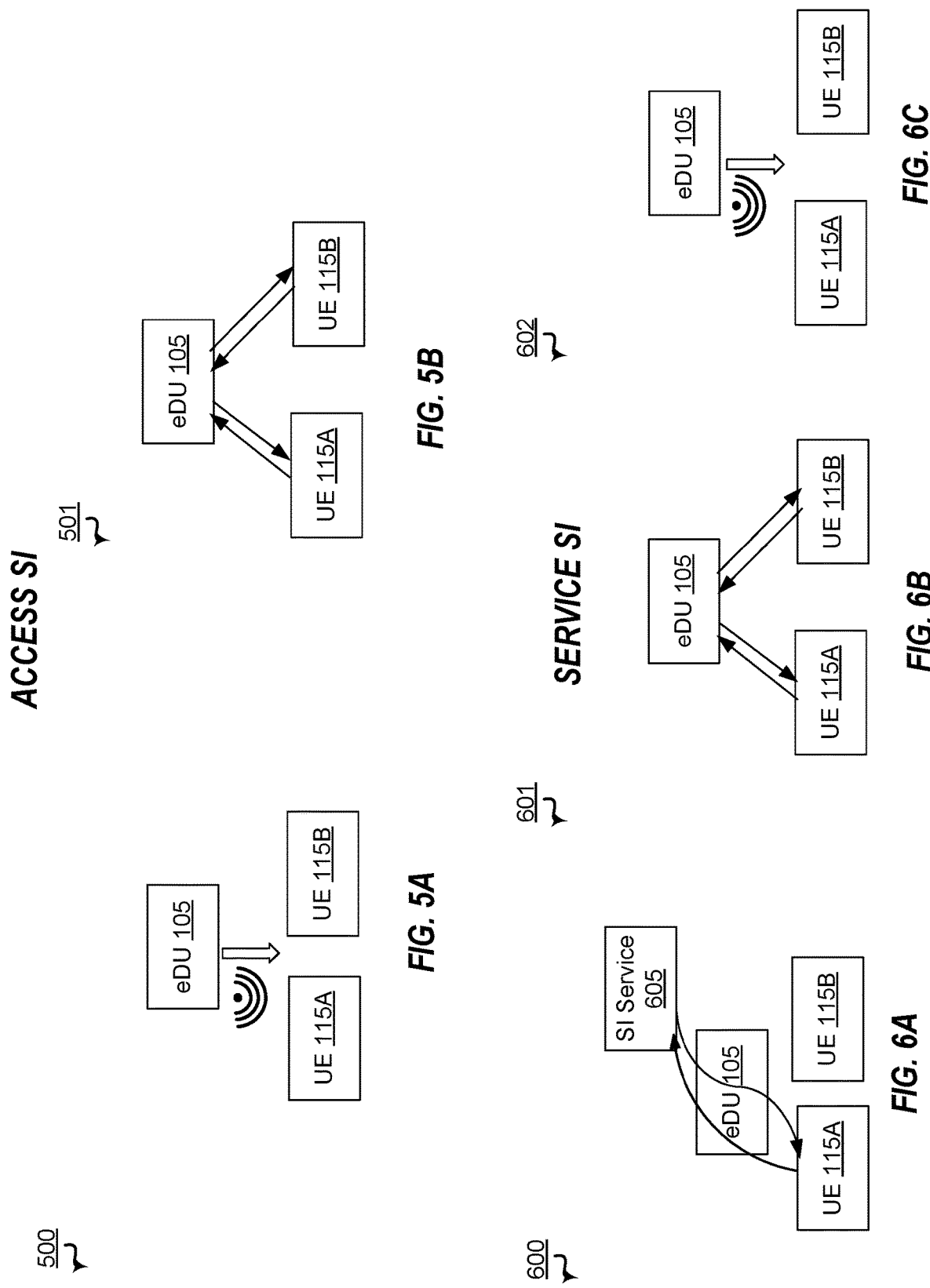
FIG. 5A is a diagram illustrating an example of access SI delivery schemes according to one or more aspects.
FIG. 5B is a diagram illustrating another example of access SI delivery schemes according to one or more aspects.
FIG. 6A is a diagram illustrating an example of service SI delivery schemes according to one or more aspects.
FIG. 6B is a diagram illustrating another example of service SI delivery schemes according to one or more aspects.
FIG. 6C is a diagram illustrating another example of service SI delivery schemes according to one or more aspects.

FIGS. 5A-5B illustrate examples of access SI delivery schemes, and FIGS. 6A-6C illustrate examples of service SI delivery schemes. Referring to FIGS. 5A and 5B, FIGS. 5A and 5B each illustrate an example of an access SI delivery scheme for a service-based wireless network. Two different access SI delivery schemes are illustrated in FIGS. 5A and 5B, a broadcast access SI delivery scheme 500 is illustrated in FIG. 5A and an on-demand access SI delivery scheme 501 is illustrated in FIG. 5B.

The examples of FIGS. 5A and 5B include one or more devices as described herein, such as one or more network devices, base stations and/or service entities, and one or more UEs. Additionally, the wireless networks in the examples of FIGS. 5A and 5B may optionally include devices of other RATs, such as one or more APs of one or more WLANs. In the examples illustrated in FIG. 5A and FIG. 5B, the networks include a base station 105 (e.g., eDU), a first UE 115A, and a second UE 115B. As illustrated in the examples, each UE is associated with and/or connected to the base station 105. For example, the UEs may be in a connected mode or an idle mode. In other implementations, one of the UEs may be a remote UE, which connects through the other UE, a relay UE.

In the example of FIG. 5A, the broadcast access SI delivery scheme 500, the base station 105 broadcasts access SI periodically, such as according to or based on physical layer parameters. The base station 105 may periodically transmit initial or base access SI information, such as similar to transmission of MIB and/or SIB1. In the example of FIG. 5A, the UEs may receive the access SI in one or more modes. To illustrate, the first UE 115 may receive the access SI in a first mode (e.g., connected) and the second UE 115B may receive the access SI in a second mode (e.g., idle, inactive, not connected, etc.).

In some such implementations, the base station 105 may periodically change or adjust the access SI and transmit updated or modified access SI. Alternatively, the base station 105 may continue to broadcast initial access SI (or a portion thereof) and may provide updates or changes to the access SI via other transmission schemes, such as unicast, or on-demand transmissions or broadcast transmissions directed only to connected devices. For example, the base station 105 may broadcast first access SI periodically, and may transmit second access SI in a dedicated or unicast manner, groupcast the second access SI to a particular group or set of UEs, or broadcast the second access SI during time periods or resources associated with connected devices. Such a broadcast scheme may enable first access SI, such as base access SI, to be broadcast to all devices (and any updates thereto), while other or second access SI, such as service discovery access SI, may be updated or updated more frequently and only transmitted to connected devices which are able to use the service or services. The service discovery access SI may include or correspond to essential information to determine or acquire service SI during service discovery operations. For example, service discovery access SI may indicate information for how to generally how to acquire service SI, such as to download service SI, obtain via broadcast, obtain via unicast, etc.

In the example operation of the broadcast access SI delivery scheme 500 of FIG. 5A, the UEs may monitor for the broadcast transmissions of the access SI once (e.g., upon initial access or connection) or periodically. For example, the UEs may monitor for access SI every transmission period, or only when their access SI has expired. To illustrate, the access SI may have an associated validity time period or indicate a duration of validity. The UEs may selectively monitor for updates every X broadcasts based on expiration of the access SI. Alternatively, the UEs may obtain access SI updates in a non-broadcast manner and similar to the operations described with reference to FIG. 5B.

In the example of FIG. 5B, the on-demand access SI delivery scheme 501, the base station 105 transmits access SI in response to a request for access SI. The base station 105 may receive requests for access SI from UEs in different modes, such as upon initial connection, in response to expiration of current access SI, etc., and the base station 105 may respond with a unicast message providing the access SI. In the example of FIG. 5B, the UEs may receive the access SI in one or more modes. To illustrate, the first UE 115A may receive the access SI in a first mode (e.g., connected) and the second UE 115B may receive the access SI in a second mode (e.g., idle, inactive, not connected, etc.). For example, the second UE 115B may request the access SI (e.g., second access SI) based on previously received access SI (e.g., first access SI) while connected to the network, such as during a previous RACH procedure.

In some implementations, the base station 105 may periodically change or adjust the access SI and transmit updated or modified access SI. In some such implementations, the base station 105 may push the updated or modified access SI to one or more devices, such as by dedicated or groupcast transmission. In other such implementations, the base station 105 may transmit a notification indicating new access SI or expiration of the current access SI, and the UEs associated with the base station 105 may request the updated access SI in a unicast manner.

Additionally, or alternatively, UEs associated with the base station 105 may request updated or modified access SI responsive to expiration of the access SI. For example, the first UE 115A and the second UE 115B may each request updated access SI at different times based on different validity timers for their current respective access SI.

In the example operation of the on-demand access SI delivery scheme 501 of FIG. 5B, the UEs transmit requests for access SI responsive to or based on one or more conditions. For example, the first UE 115A may transmit a first access SI request responsive to connection to the base station 105, and the second UE 115B may transmit a second access SI request based on or in connection with a transition to another operating mode or to expiration of their current access SI.

Unicast delivery may enable the transmission of different types of access SI or different amounts of access SI, such as full and partial access SI. The transmission of different types of access SI may enable devices to connect to one or more networks in a more flexible manner. For example, certain UEs (e.g., a remote or indirect connection UE) may receive additional or extra access SI or partial access SI based on connecting via a relay UE or via an access point. As another example, other types of UEs (e.g., relays UEs) may receive additional or extra access SI or partial access SI based on providing a connection or bridge to the base station 105 for one or more other devices (e.g., other UEs).

UEs may monitor for access SI every transmission period, or only when their access SI has expired. To illustrate, the access SI may have an associated validity time period or indicate a duration of validity. The UEs may selectively monitor for updates every X broadcasts based on expiration of the access SI. Alternatively, the UEs may obtain access SI updates in a non-broadcast manner and similar to the operations described with reference to FIG. 5B.

In some implementations, a network may utilize both schemes of FIGS. 5A and 5B, or portions thereof. For example, the base station 105 may broadcast first access SI periodically as in the example of FIG. 5A, and may transmit second access SI in a unicast manner. The second access SI may include or correspond to updated access SI, access SI for certain operating modes (e.g., idle mode) or connection modes (e.g., indirect connection).

Referring to FIGS. 6A, 6B, and 6C, FIGS. 6A-6C each illustrate an example of a service SI delivery scheme for a service-based wireless network. Three different types of SI delivery schemes are illustrated in FIGS. 6A-6C, a service SI download delivery scheme 600 is illustrated in FIG. 6A, an on-demand service SI delivery scheme 601 is illustrated in FIG. 6B, and a broadcast service SI delivery scheme 602 is illustrated in FIG. 6C.

The examples of FIGS. 6A-6C include one or more devices as described herein, such as one or more network devices, base stations and/or service entities, and one or more UEs Additionally, the wireless networks in the examples of FIGS. 6A-6C may optionally include devices of other RATs, such as one or more APs of one or more WLANs. In the examples illustrated in FIG. 6A-6C, the networks include a base station 105 (e.g., eDU), a service entity (e.g., SI service 605), a first UE 115A, and a second UE 115B. As illustrated in the examples, each UE is associated with and/or connected to the base station 105. For example, the UEs may be in a connected mode or an idle mode. In other implementations, one of the UEs may be a remote UE, which connects through the other UE, a relay UE.

In the example of FIG. 6A, the service SI download delivery scheme 600, the base station 105 facilitates download of service SI from a SI service entity, SI service 605. For example, the base station 105 may receive requests for service SI from one or more UEs for service information of the SI service 605, such as service SI information 408. The base station 105 may then route the request from the UE(s) to the SI service 605 and provide or route service SI received from the SI service 605 to the UE(s). Alternatively, the base station 105 may facilitate connection of the UE(s) to the SI service 605, and the UE(s) can download/receive the service SI from the SI service 605 directly. For example, the base station 105 may assist the devices in establishing a direct connection between the UE(s) and the SI service 605 and the UE(s) and the SI service 605 communicate SI directly without the base station 105.

The base station 105 may be separate from the SI service 605 or integrated with the SI service 605. Examples of integrated and separate SI services are described further with reference to FIGS. 7 and 8. In the example of FIG. 6A, the UEs may receive the service SI in one or more modes. To illustrate, the first UE 115 may receive the service SI in a first mode (e.g., connected) and the second UE 115B may receive the service SI in a second mode (e.g., idle, inactive, not connected, etc.).

In some such implementations, the SI service 605 and/or base station 105 may periodically change or adjust the service SI and transmit updated or modified service SI. Alternatively, the SI service 605 and/or base station 105 may continue to provide initial service SI (or a portion thereof) via download and may provide updates or changes to the service SI via other transmission schemes, such as unicast, or on-demand transmissions or broadcast transmissions similar to the schemes for access information as described with reference to FIGS. 5A and 5B. For example, the base station 105 may facilitate downloading of first service SI from the SI service 605, and may transmit second service SI (updated service SI or service SI changes) in a dedicated or unicast manner, groupcast the second service SI to a particular group or set of UEs, or broadcast the second service SI during time periods or resources associated with connected devices. Such a scheme may enable the bulk of service SI to be downloaded, while other service SI, such as updates to the timing or parameters of services, may be updated or updated more frequently and only transmitted to connected devices which may use the service or more efficiently broadcast to all devices.

In the example operation of the service SI download delivery scheme 600 of FIG. 6A, after receiving access SI as described with reference to one of the schemes of FIG. 5A and/or FIG. 5B, a UE may request service SI based on and/or responsive to receiving the access SI. For example, the first UE 115A may request service SI or a service SI download by transmitting a message to the base station 105. The base station 105 may receive the message and route the message to the SI service 605, or transmit a notification to the SI service indicating a service SI download for the first UE 115A. The base station 105 may receive service SI download information from the SI service 605 responsive to the transmission from the base station 105. The base station 105 may then transmit or route the received SI download information to the first UE 115A. Alternatively, the base station 105 may facilitate a download connection between the first UE 115A and the SI service 605 to enable the first UE 115A to directly download the service SI from the SI service 605. To illustrate, the base station 105 may transmit a notification to the first UE 115A providing the first UE 115A with download key or service SI access information, information regarding connecting to SI service 605, and/or information regarding a transmission from the SI service 605 which includes the service SI (e.g., service SI download information).

The first UE 115A receives the service SI from the SI service 605, either directly from the SI service 605 or indirectly via the base station 105. The first UE 115A may then use the network and the various services thereof. For example, the first UE 115 may transmit communications to the base station 105, the SI service 605, or a service entity (not shown) which provides the service to operate on the network and utilize the services thereof.

In some implementations, after initial download of service SI, the UEs of the network may receive updates for the service SI via additional downloads. For example, a UE, such as the first UE 115A, may request a service SI download update and receive SI download information in a similar manner responsive to a determination at the first UE 115A that updated service SI is available and/or responsive to or based on a determination that the service SI has expired or is no longer valid. Additionally, or alternatively, the UEs of the network may receive updates for the service SI via another delivery scheme such as a unicast or on-demand delivery scheme described with reference to FIG. 6B and/or a broadcast delivery scheme described with reference to FIG. 6C.

In the example of FIG. 6B, the on-demand service SI delivery scheme 601, the base station 105 transmits service SI in response to a request for service SI. The base station 105 may receive requests for service SI from UEs in different modes, such as upon initial connection, in response to expiration of current service SI, etc., and the base station 105 may respond with a unicast message providing the service SI. In the example of FIG. 6B, the UEs may receive the service SI in one or more modes. To illustrate, the first UE 115A may receive the service SI in a first mode (e.g., connected) and the second UE 115B may receive the service SI in a second mode (e.g., idle, inactive, not connected, etc.).

In some implementations, the base station 105 may periodically change or adjust the service SI and transmit updated or modified service SI. In some such implementations, the base station 105 may push the updated or modified service SI to one or more devices, such as by dedicated transmission or groupcast transmission. In other such implementations, the base station 105 may transmit a notification indicating new service SI or expiration of the current service SI, and the UEs associated with the base station 105 may request the updated service SI in a unicast manner.

Additionally, or alternatively, UEs associated with the base station 105 may request updated or modified service SI responsive to expiration of the service SI. For example, the first UE 115A and the second UE 115B may each request updated service SI at different times based on different validity timers for their current respective service SI.

In the example operation of the on-demand service SI delivery scheme 601 of FIG. 6B, the UEs transmit requests for service SI responsive to or based on one or more conditions. For example, the first UE 115A may transmit a first service SI request responsive to connection to the base station 105, and the second UE 115B may transmit a second service SI request based on or in connection with a transmission to another operating mode or connection to the base station 105 via another device.

Unicast delivery may enable the transmission of different types of service SI or different amounts of service SI, such as full and partial service SI. The transmission of different types of service SI may enable devices to connect to one or more networks in a more flexible manner. For example, certain UEs (e.g., a remote or indirect connection UE) may receive additional or extra service SI or partial service SI based on connecting via a relay UE or via an access point (AP) or based on their location (e.g., only receive information for services related to or offered in their location, such as cell or group of cells, often referred to as area scope). As another example, other types of UEs (e.g., relays UEs) may receive additional or extra service SI or partial service SI based on providing a connection or bridge to the base station 105 for one or more other devices (e.g., other UEs).

In the example of FIG. 6C, the broadcast service SI delivery scheme 602, the base station 105 broadcasts service SI periodically, such as according to or based on physical layer parameters and as indicated by the access information. The base station 105 may periodically transmit initial or base service SI information, such as similar to transmission of SIBs 2-21. In the example of FIG. 6C, the UEs may receive the service SI in one or more modes. To illustrate, the first UE 115A may receive the service SI in a first mode (e.g., connected) and the second UE 115B may receive the service SI in a second mode (e.g., idle, inactive, not connected, etc.).

In some such implementations, the base station 105 may periodically change or adjust the service SI and transmit updated or modified service SI. Alternatively, the base station 105 may continue to broadcast initial service SI (or a portion thereof) and may provide updates or changes to the service SI via other transmission schemes, such as by download, unicast, on-demand transmissions, groupcast transmissions, or broadcast transmissions directed only to connected devices. For example, the base station 105 may broadcast first service SI periodically, and may transmit second service SI in a dedicated or unicast manner, group-cast the second service SI to a particular group or set of UEs, or broadcast the second service SI during time periods or resources associated with connected devices. Such a service SI broadcast scheme may enable basic service SI to be broadcast to all devices (and any updates thereto), while other service SI, such as updates to service SI or service SI for particular connection modes, connection types, or certain locations, may be updated or updated more frequently and only transmitted to applicable and/or connected devices which may use the service.

In the example operation of the broadcast service SI delivery scheme 602 of FIG. 6C, the UEs may monitor for the broadcast transmissions of the service SI once (e.g., upon initial service or connection) or periodically. For example, the UEs may monitor for service SI every transmission period, or only when their service SI has expired. To illustrate, the service SI may have an associated validity time period or indicate a duration of validity. The UEs may selectively monitor for updates every X broadcasts based on expiration of the service SI. Alternatively, the UEs may obtain service SI updates in a non-broadcast manner and similar to the operations described with reference to FIGS. 6A and 6B.

In some implementations, a network may utilize one or more of the SI service delivery schemes of FIGS. 6A-6C, or portions thereof. For example, the base station 105 may provide first service SI via download as in the example of FIG. 6A, and may transmit second service SI in a unicast manner or by broadcast. The second service SI may include or correspond to updated service SI, service SI for certain operating modes (e.g., idle mode) or connection modes (e.g., indirect connection).

Although described a discrete access and/or service SI delivery schemes, the SI delivery schemes of examples of FIGS. 5A, 5B, 6A, 6B, and/or 6C may be combined in one or more other implementations. Specific examples of SI download and SI update, such as service SI download and service SI update, are described further with reference to FIGS. 7 and 8.

Figure 7:
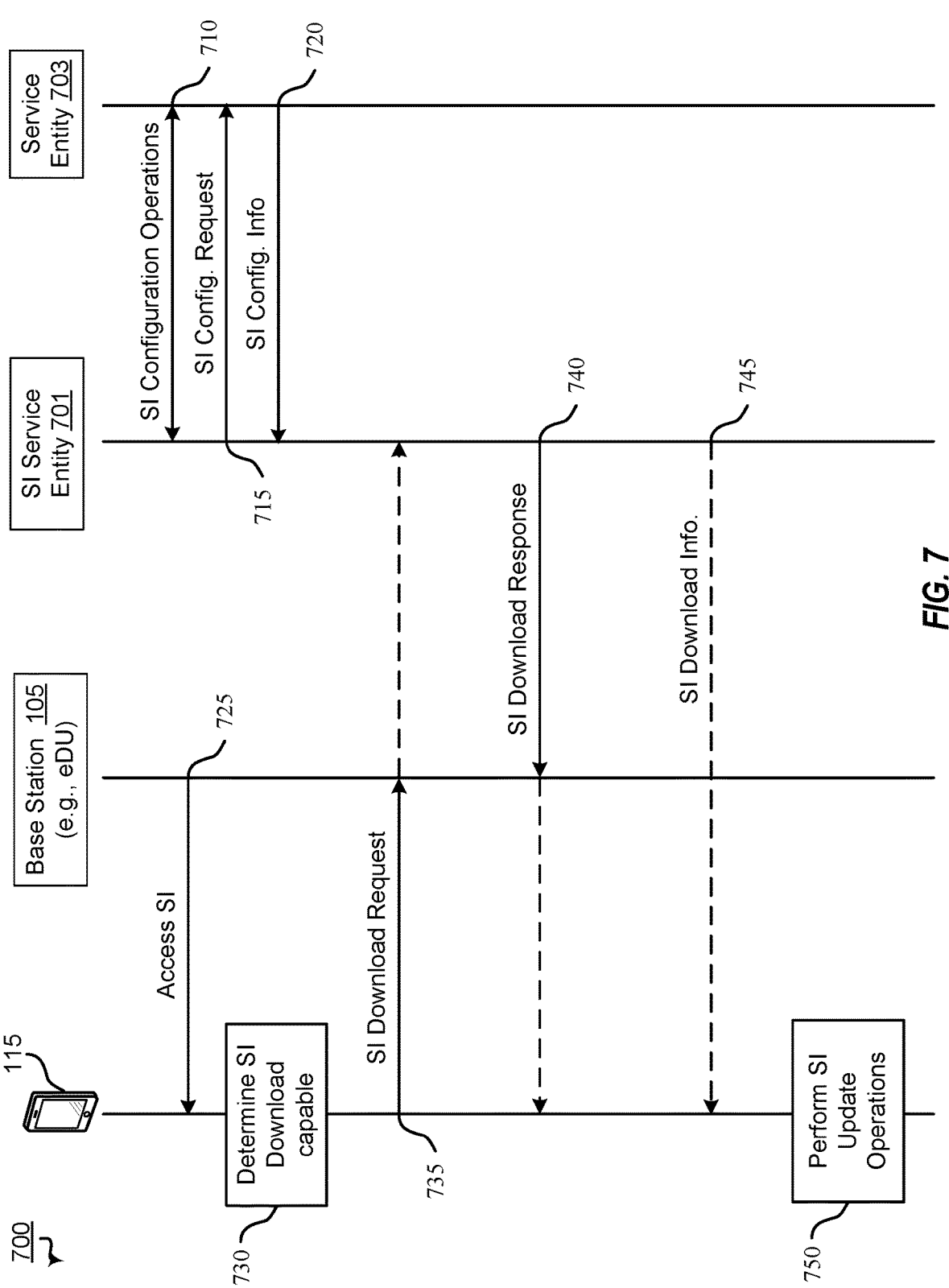
FIG. 7 is a diagram illustrating an example of SI download operations according to one or more aspects.

Referring to FIG. 7, FIG. 7 is a timing diagram 700 illustrating a wireless communication system that supports enhanced SI delivery operations according to one or more aspects. The example of FIG. 7 corresponds to an example of SI download operations for a SI service entity which is separate from a base station, and which may include service SI downloads.

The example of FIG. 7 includes similar devices to the devices described in FIGS. 1, 2, 4, 5A-5B, and 6A-6C, such as a UE 115, a network entity (e.g., base station 105), a SI service entity 701, and a service entity 703. The devices of FIG. 7 may include one or more of the components as described in FIGS. 2 and 4. In FIG. 7, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate and receive transmissions. In some implementations, the base station 105 may be separate from the service entity 703, as illustrated and described in FIG. 7. In other implementations, the network entity may include or correspond to an eDU and may be integrated with one or more services, or more SI service entities, or both, as illustrated and described with reference to FIG. 8. The service entity 703 may provide one or more services to devices of the network, such as the base station 105, UE 115, or both.

At 710, the SI service entity 701 and the service entity 703 may optionally perform one or more SI configuration operations (e.g., service SI configuration operations) with each other. For example, the SI service entity 701, the service entity 703, or both, communicate configuration information (e.g., service SI configuration information) to enable service SI download and/or update operations. As one example SI configuration, the SI service entity 701 transmits an SI configuration request indicating a request for SI service or SI service configuration information to the service entity 703 at 715. To illustrate, the SI service entity 701 may transmit a transmission including a request for particular SI configuration information, SI update information, etc.

Based on and responsive to the SI configuration request, the service entity 703 may transmit an SI configuration transmission including SI configuration information, such as service SI configuration information, to the SI service entity 701, at 720. The SI configuration transmission may include service SI (one or more SIBs) for or associated with the service entity 703 and configuration information for the service SI, such as scheduling or timing information for the service SI, location information for the service SI, validity information for the service SI, etc.

Although two transmissions and a pull type operation of SI configuration information is illustrated in the example of FIG. 7, in other implementations, the SI service entity 701 may not transmit a SI configuration request at 715, and the service entity 703 may push service configuration information (and/or updates thereto) to the SI service entity 701. For example, the service entity 703 may transmit service SI configuration information periodically to the SI service entity 701 or responsive to updates to the service SI configuration information or service.

Some time after or concurrently with SI configurations at 710, a UE and base station may be associated with each other and the base station provides access SI to the UE for use in SI download operations. For example, the UE 115 and base station 105 may perform one or more of the operations as described with reference to FIGS. 3A-6C.

At 725, the base station 105 transmits access SI to the UE 115. For example, the base station 105 may broadcast the access SI to one or more groups of UEs such as described with reference to FIG. 5A. To illustrate, the base station 105 generates and periodically broadcasts a higher layer transmission including access SI to all devices within a coverage area or to all devices in particular modes, such as by using transmission resources associated with such modes (e.g., when devices in those modes would be awake). In some such implementations, the base station 105 may transmit (e.g., broadcast) a RRC, IB, or RACH transmission including the access SI to all devices.

Alternatively, the base station 105 may provide the access information in a unicast manner, such as described with reference to FIG. 5B. For example, the base station 105 may generate and transmit a data channel transmission including access SI and transmit the data channel transmission responsive to an access SI request from the UE (not shown) as in FIG. 5B. To illustrate, the base station 105 may transmit a PDSCH transmission including the access SI. As another example, the base station 105 may generate and transmit a control channel transmission including access SI and transmit the control channel transmission responsive to an access SI request from the UE (not shown) as in FIG. 5B. To illustrate, the base station 105 may transmit a PDCCH transmission including the access SI. In some such implementations, the base station 105 may transmit a DCI (e.g., paging DCI) indicating the access SI is available prior to receiving an access SI request transmission, which may trigger the UE 115 to transmit a request for the access SI (e.g., an access SI request transmission).

In other such implementations, the base station 105 may generate and transmit a control channel transmission including access SI and transmit the control channel transmission responsive to an access SI request from the UE (not shown) as in FIG. 5B. To illustrate, the base station 105 may transmit a PDCCH including the access SI. In some such implementations, the base station 105 may transmit a DCI (e.g., paging DCI) indicating access SI is available, and which may trigger the UE 115 to transmit a request for the access SI.

At 730, the UE 115 determines whether to perform SI download operations. For example, the UE 115 may determine whether SI download operations are supported by the base station 105, one or more associated services or service entities, or a combination thereof. For example, the UE 115 may determine that access SI download operations are not supported and that service SI download operations are supported. The UE 115 may determine whether SI download operations are supported based on the received access SI in some implementations. In the example of FIG. 7, the UE determines that service SI download operations are supported and to receive the service SI download information via a download delivery scheme.

At 735, the UE 115 may optionally transmit a service SI download request to initiate a service SI download procedure. For example, the UE 115 may optionally transmit a service SI download request to the base station 105 which routes the service SI download request to the SI service entity 701. The service SI download request may indicate a request for all applicable service SI or a request for particular service SI (e.g., a request for initial service SI or a service SI update). Alternatively, the base station 105 may receive the service SI download request (e.g., service SI download request information) and transmit a notification or indication for the service SI download request to the SI service entity 701.

Alternatively, the UE 115 does not transmit a service SI download request and the UE 115 receives a service SI download indication or service SI download information responsive to receiving the access SI from the base station 105 in other implementations. In such implementations, the base station 105 may transmit a service download request to the SI service entity 701 for or on-behalf of the UE 115, such as responsive to the UE 115 connecting to the base station 105 (e.g., initially or via a particular type of connection, such as relay or indirect connection) or transition to a particular mode.

At 740, the SI service entity 701 optionally transmits a SI download response. For example, the SI service entity 701 transmits a service SI download response in response to the service SI download request from the base station 105, which may be generated based on the SI download request from the UE 115.

In some implementations, the SI service entity 701 transmits the SI download response to the UE 115. In some such implementations, the SI service entity 701 transmits the SI download response to the UE 115 directly. For example, in such implementations, the base station 105 may not forward, route or provide the service SI download response to the UE 115. In some other such implementations, the SI service entity 701 transmits the SI download response to the UE 115 via the base station 105. For example, in such implementations, the base station 105 forward, route or provide the service SI download response to the UE 115. In such implementations where the SI download response is provided to the UE 115, the SI download response may include information for establishing a direct connection with the UE 115, for an SI download, or for establishing a download of SI via the base station 105.

In other implementations, the SI service entity 701 transmits the SI download response to the base station 105. For example, in such implementations, the base station 105 may not forward, route or provide the service SI download response to the UE 115 and rather the base station 105 may generate a new transmissions including service SI download information of the service SI download response. To illustrate, the SI download response may include information indicating whether SI download updates are available or may include the SI download information, and the base station 105 may generate a new transmission indicating whether the SI download updates are available or including the SI download information.

At 745, the SI service entity 701 transmits SI download information to the UE 115. In some implementations, the SI service entity 701 transmits the SI download information to the UE 115 directly. For example, the SI service entity 701 may establish a direct communication link to the UE 115 based on one or more previous transmissions, such as the SI download request and/or the SI download response, and the SI service entity 701 may transmit the SI download information directly to the UE 115. In some such implementations, the UE 115 may receive the SI download information via an API and may receive the SI download information responsive to an API request (not shown) transmitted to the SI service entity 701. The API request may be generated based on SI download response information in the SI download response and/or based on access information from the base station 105.

In other implementations, the SI service entity 701 transmits the SI download information to the UE 115 via the base station 105. In such implementations where the SI download information is provided to the UE 115 via the base station 105, the SI download information may be included in a transparent container which is first transported to the base station 105 and then routed to the UE 115. The transparent container may refer to a transmission which includes a container that is used to pass information transparently from a source (e.g., SI service) to a target (e.g., UE) by the base station 105. Examples of a transparent container include a non-access-stratum (NAS) transparent container or a steering of roaming (SOR) transparent container. Alternatively, the SI service entity 701 may provide the SI download information to the UE 115 via an API (e.g., in an API response message responsive to an API request message for SI download information).

The SI download information may include or correspond to access SI download information, service SI download information, or a combination thereof. As illustrated in the example of FIG. 7, the SI download information may include or correspond to service SI download information for the service entity 703.

Alternatively, the SI service entity 701 transmits the SI download information to the base station 105. For example, in such implementations the base station 105 may receive the SI download information periodically from one or more SI service entities, and provide aggregated SI download information for multiple SI service entities to the UE 115 responsive to a download request, such as by API.

At 750, the UE 115 optionally performs SI update operations. For example, the UE 115 may perform one or more access SI update operations as described herein, one or more service SI update operations as described herein, or a combination thereof. To illustrate, UE 115 may receive second or updated access SI by unicast or broadcast as described with reference to FIGS. 5A and 5B, may receive second or updated service SI by, download, unicast, or broadcast as described with reference to FIGS. 6A-6C, or a combination thereof. An example of SI update operations is described further with reference to FIG. 8. Specifically, service SI update operations are described with reference to a network including an eDU with an integrated SI service entity.

Figure 8:
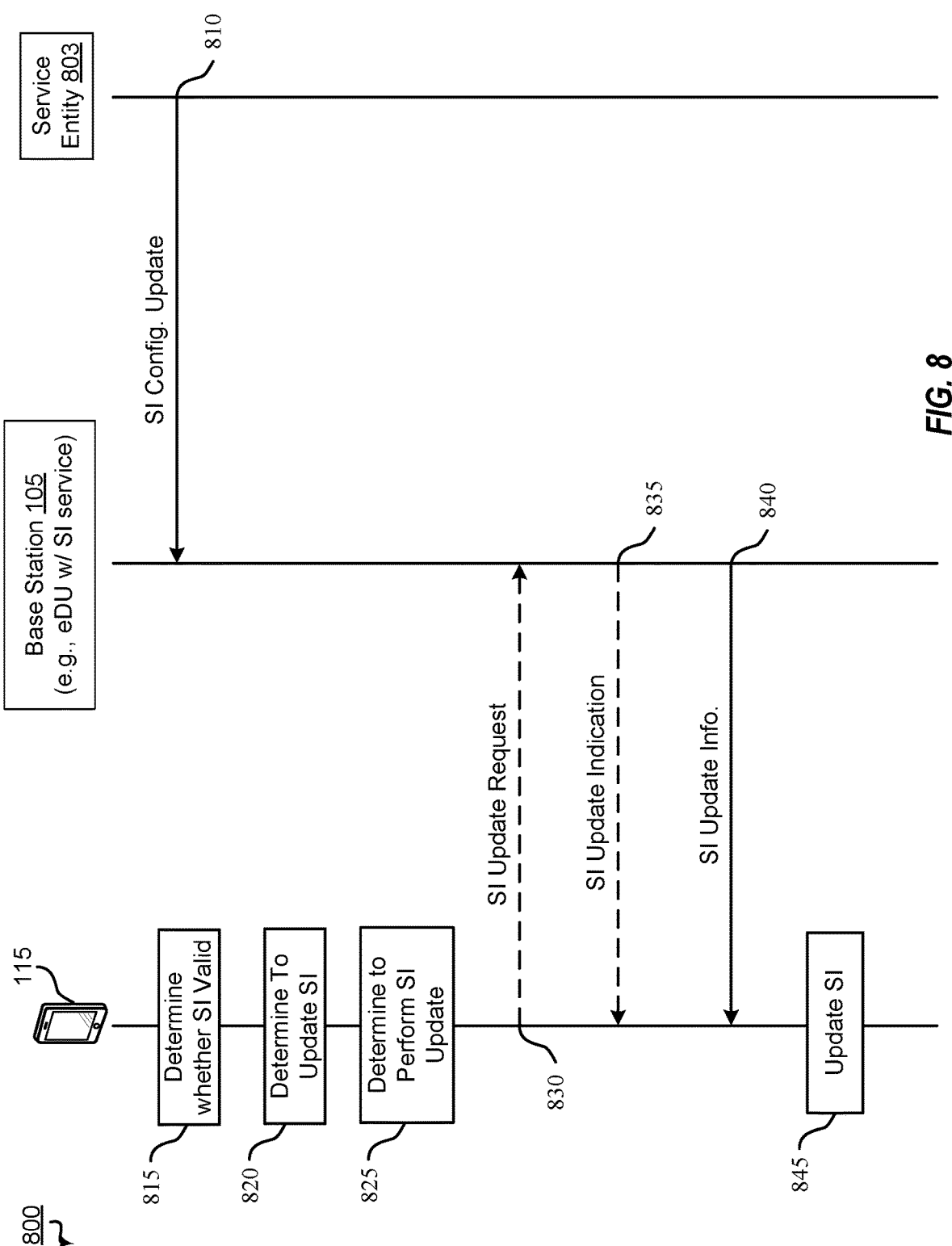
FIG. 8 is a flow diagram illustrating an example of SI update operations according to one or more aspects.

Referring to FIG. 8, FIG. 8 is a timing diagram 800 illustrating a wireless communication system that supports enhanced SI delivery operations according to one or more aspects. The example of FIG. 8 corresponds to an example of SI update operations for an integrated base station and a SI service entity, and which may include service SI updates.

The example of FIG. 8 includes similar devices to the devices described in FIGS. 1, 2, 4, 5A-5B, 6A-6C, and 7, such as a UE 115, a network entity (e.g., base station 105 integrated with a SI service, such as a SI service entity 701), and a service entity 803. The devices of FIG. 8 may include one or more of the components as described in FIGS. 2 and 4. In FIG. 8, these devices may utilize antennas 252a-r, transmitter 410, receiver 412, encoder 413 and/or decoder 414, or may utilize antennas 234a-t, transmitter 434, receiver 436, encoder 437, and/or decoder 438 to communicate and receive transmissions. In some implementations, the network entity, base station 105, may include or correspond to an eDU and may be integrated with one or more services, or more SI service entities, or both. In other implementations, the base station 105 may be separate from the SI service entity, as described with reference to FIG. 7. The service entity 803 may provide one or more services to devices of the network, such as the base station 105, UE 115, or both.

At 810, the base station 105 and the service entity 803 may optionally perform one or more SI configuration update operations (e.g., service SI configuration operations) with each other, similar to the SI configuration operations described with reference to 710 of FIG. 7. For example, the base station 105, the service entity 803, or both, communicate configuration update information (e.g., service SI configuration update information) to enable service SI update operations. As one example SI configuration update, the base station 105 (e.g., a SI service entity thereof, such as SI service entity 701) transmits an SI configuration update request indicating a request for updated SI service or SI service configuration information to the service entity 803. To illustrate, the base station 105 may transmit a transmission including a request for particular updated SI configuration information, SI update information, etc.

Based on and responsive to the SI configuration update request, the service entity 803 may transmit an SI configuration updated transmission including SI configuration updated information, such as service SI configuration update information, to the base station 105. The SI configuration update transmission may include SI update information, such as service SI update information (one or more SIBs) for or associated with the service entity 803 and configuration information for the SI update information, such as scheduling or timing information for the service SI, location information for the service SI, validity information for the service SI, etc. Alternatively, the service entity 803 may push or transmit the SI update information to the base station 105 independent of an update request from the base station 105, such as periodically (e.g., update timer based, validity timer based, etc.), or responsive to determining one or more changes to the service SI (e.g., determining one or more updates to the service).

Prior to 815, a UE and base station may become associated with one another and the base station provides access SI and service SI to the UE for use in network operations. For example, the UE 115 and base station 105 may perform one or more of the operations as described with reference to FIGS. 3A-7.

Some time after, or concurrently with, a SI configuration update operation or operations at 810, the UE 115 and base station 105 may perform one or more SI update operations from 815 to 845. The SI update operations may be configured to update access SI, service SI, or both, and may utilize any of the update schemes described herein. In the example of FIG. 8, an exemplary service SI update is performed.

At 815, the UE 115 determines whether current SI information is valid. For example, the UE 115 may determine whether current access SI, service SI, or both have expired or are still valid based on one or more conditions. To illustrate, the UE 115 may determine whether an expiration or validity timer has expired. Additionally, or alternatively, the UE 115 may determine whether an update timer has expired. Additionally, or alternatively, the UE 115 may determine whether it has received an SI update indication. Additionally, or alternatively, the UE 115 may determine whether the UE 115 has changed modes and should request additional or different SI, such as access SI for a different mode or type of connection or service SI for a different service or location. Additionally, or alternatively, the UE 115 may determine whether another device (e.g., remote UE) that is connected to the base station 105 via the UE 115 (e.g., relay UE) requested or needs additional or different SI, such as access SI for a different mode or type of connection or service SI for a different service or location. The current SI information may include or correspond to original SI or modified/updated SI.

At 820, the UE 115 determines whether to update its SI. For example, the UE 115 may determine to update its SI based on one or more determinations at 815. To illustrate, the UE 115 may utilize a series of determinations or set of conditions for determining whether to update its SI. As an illustrative example, the UE 115 may use a first series of determinations or set of conditions for updating access SI and a second series of determinations or set of conditions for updating service SI. Additionally, or alternatively, the UE 115 may use a first series of determinations or set of conditions for updating SI in a connected mode and a second series of determinations or set of conditions for updating SI when not in a connected mode.

At 825, the UE 115 determines to perform an SI update operation to update its SI. For example, the UE 115 may determine to perform one or more SI update operations based on the determinations at 820, which also may be based on one or more determinations at 815. To illustrate, the UE 115 may determine to perform the SI update operation based on the determinations of 815 and/or 820 and being in a particular type of mode or connection, and having expired SI or responsive to a determination of updated SI from an SI update message. As another illustration, the UE 115 may determine not to perform an SI update operation based on the determinations of 815 or 820, such as based on a particular type of connection mode and/or type of status.

Determining to perform an SI update operation may include determining what type of update to perform. For example, the UE 115 may determine to update access SI, service SI, or both. Additionally, or alternatively, the UE 115 may determine which update method or scheme to use to update the SI. To illustrate, the UE 115 may determine whether to use a download update scheme, a unicast update scheme, or a broadcast update scheme, as described with reference to FIGS. 5A-6C.

For example, the UE 115 may determine whether SI update operations are supported by the base station 105, one or more associated services or service entities, or a combination thereof. For example, the UE 115 may determine that access SI update operations are not supported and that service SI update operations are supported. The UE 115 may determine whether SI update operations are supported based on the received access SI in some implementations. In the example of FIG. 8, the UE determines that service SI update operations are supported and to receive the service SI update information via an update delivery scheme.

At 830, the UE 115 may optionally transmit a service SI update request to initiate a service SI update procedure. For example, the UE 115 may optionally transmit a service SI update request to the base station 105. The service SI update request may indicate a request for all applicable service SI or a request for particular service SI (e.g., a request for initial service SI or a service SI update). Alternatively, the base station 105 may receive the service SI update request (e.g., service SI update request information) and transmit a notification or indication for the service SI update request to the base station 105 (e.g., SI service entity thereof).

Alternatively, the UE 115 does not transmit a service SI update request and the UE 115 receives a service SI update indication or service SI update information responsive to determining that a SI update (e.g., service SI update) is available in other implementations, as described with reference to 815-825. In some such implementations, the base station 105 may transmit a service SI update request to the service entity 803 for, or on-behalf of, the UE 115, such as responsive to the UE 115 connecting to the base station 105 (e.g., initially or via a particular type of connection, such as relay or indirect connection) or transition to a particular mode. Additionally, or alternatively, the base station 105 may transmit a service SI update indication to the UE 115 to indicate an SI update is available and/or that particular SI has expired. In some such implementations, the UE 115 may not perform the determination operations at 815-825.

At 835, the base station 105 optionally transmits a SI update response. For example, the base station 105 (e.g., SI service entity thereof) transmits a service SI update indication in response to the service SI update request from the base station 105, which may be generated based on the SI update request from the UE 115. In such implementations where the SI update response is provided to the UE 115, the SI update response may include information for establishing a download connection with the UE 115, for an SI download update, or for establishing an update of SI via the base station 105 using unicast transmission.

At 840, the base station 105 transmits SI update information to the UE 115. In some implementations, the base station 105 (e.g., SI service entity thereof) transmits the SI update information to the UE 115 via download, broadcast, or unicast. For example, the base station 105 (e.g., SI service entity thereof) may establish or reestablish a download communication link with the UE 115 based on one or more previous transmissions, such as the SI update request and/or the SI update response, and the base station 105 may transmit the SI update information directly to the UE 115 in a download or unicast manner. In some such implementations, the UE 115 may receive the SI update information via API and may receive the SI update information responsive to an API request (not shown) transmitted to the base station 105. The API request may be generated based on SI update response information in the SI update response and/or based on access information from the base station 105. Alternatively, the base station 105 may transmit the service SI update via broadcast or groupcast to multiple UEs.

In other implementations, the service entity 803 transmits the SI update information to the UE 115 via the base station 105. In such implementations where the SI update information is provided to the UE 115 from the service entity 803 via the base station 105, the SI update information may be included in a transparent container which is first transported to the base station 105 and then routed to the UE 115. Alternatively, the base station 105 (e.g., SI service entity thereof) may provide the SI update information to the UE 115 via an API (e.g., in an API response message responsive to an API request message for SI update information). Alternatively, the base station 105 (e.g., SI service entity thereof) may establish a direct communication link between the service entity 803 and the UE 115 based on one or more previous transmissions, such as the SI update request and/or the SI update response, and the service entity 803 may transmit the SI update information directly to the UE 115.

The SI update information may include or correspond to access SI update information, service SI update information, or a combination thereof. As illustrated in the example of FIG. 8, the SI update information may include or correspond to service SI update information for the service entity 803.

Alternatively, the service entity 803 transmits the SI update information to the base station 105. For example, in such implementations, the base station 105 may receive service SI update information periodically from one or more service entities, and provide aggregated service SI update information for multiple SI service entities to the UE 115 responsive to an update request, such as by API.

At 845, the UE 115 updates its SI based on the SI update information. For example, the UE 115 may receive the SI update information and update its access SI, service SI, or both, based on the SI update information. In the example of FIG. 8, the UE 115 updates its service SI information (or a portion thereof) based on the receive service SI update information. After 845, the devices may optionally communicate one or more transmissions and engage in one or more services of the network, as described with reference to FIG. 4.

Figure 11:
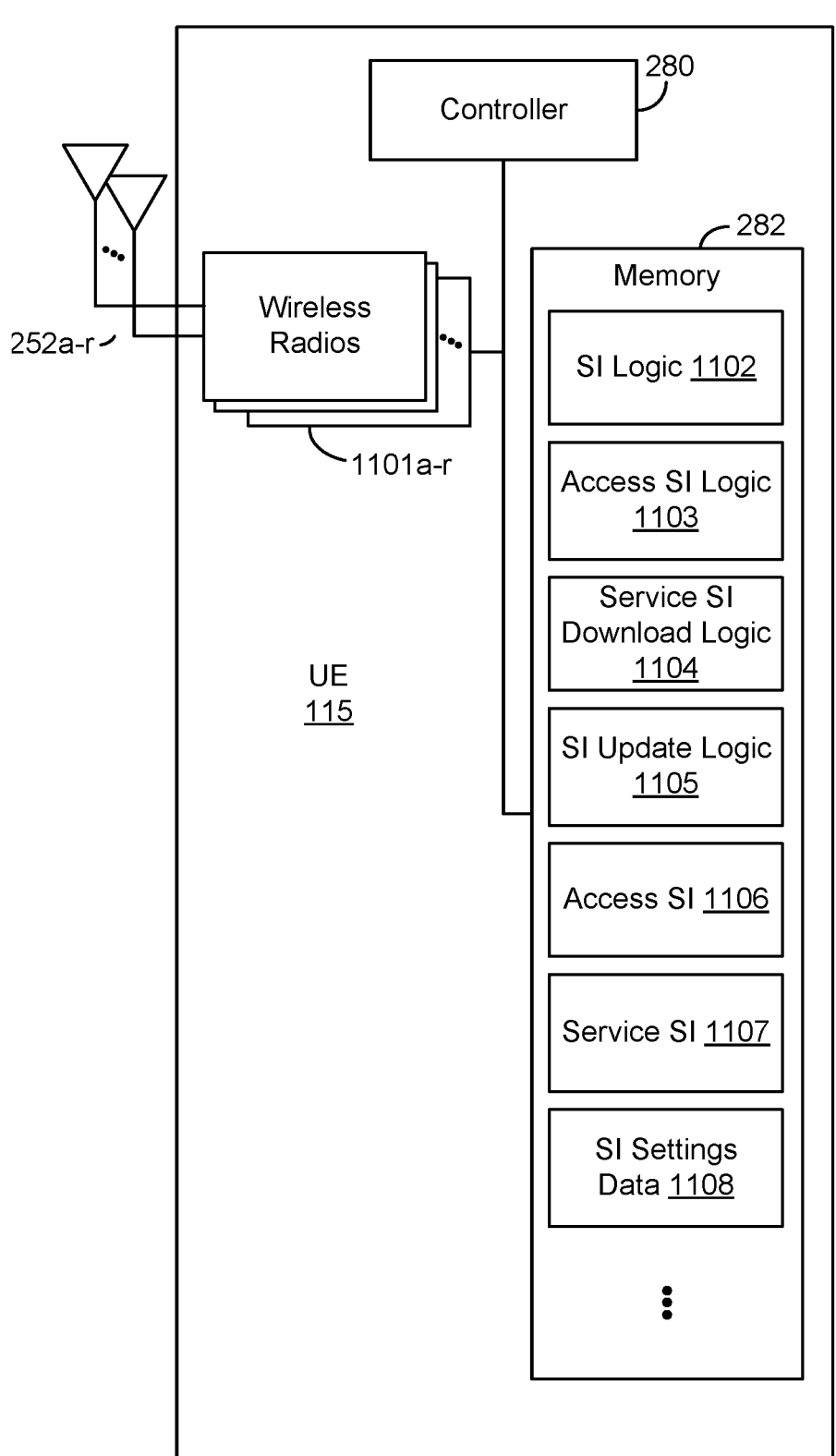
FIG. 11 is a block diagram of an example UE that supports enhanced SI delivery operations according to one or more aspects.

FIG. 9 is a flow diagram 900 illustrating example blocks executed by a wireless communication device (e.g., a UE or base station) configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101*a-r* and antennas 252*a-r*. Wireless radios 1101*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 11, memory 282 stores one or more of SI logic 1102, access SI logic 1103, service SI download logic 1104, SI update logic 1105, access SI 1106, service SI 1107, or SI settings data 1108. The data (1102-1108) stored in the memory 282 may include or correspond to data and/or logic to enable the operations of FIGS. 4-6.

At block 902, a wireless communication device, such as a UE or a base station, receives access SI from a network device. The access SI may include or correspond to one or more of the access SI information 406 of FIG. 4 or access SI of the access SI transmission 452 of FIG. 4. For example, the UE 115 receives the access SI information 406 from the base station 105 as in FIG. 4. As another example, the UE 115 receives the access SI information 406 from the base station 105 in an access SI transmission, such as at 725 of FIG. 7, or receives access SI update information in an update transmission, such as at 840 of FIG. 8.

At block 904, the wireless communication device transmit a service SI request based on the received access SI, the service SI request comprising a service SI download request and indicating a request for particular service SI data. The service SI request may include or correspond to service SI request as in FIG. 6A or 6B, or the SI download request at 735 of FIG. 7, or the SI update request at 830 of FIG. 8. For example, the UE 115 transmits a service SI download request transmission to the base station 105, such as at 735 of FIG. 7, or transmits a service SI update request transmission to the base station 105, such as at 830 of FIG. 8. The service SI request may indicate a request for downloading the particular service SI data, such as the service SI download data.

At block 906, the wireless communication device receives the particular service SI data, the particular service SI data including one or more SI blocks (SIBs), scheduling information for the one or more SIBs, or both. The transmission may include or correspond to the service SI transmission

454 of FIG. 4 or SI download transmissions of FIG. 6A, 7, or 8. The particular service SI data may include or correspond to service SI as in any of FIG. 3A, 4, 5, 6A-6C, 7, or 8, such as service SI information 408. For example, the UE 115 may receive the service SI transmission 454 including particular service SI data via a download operation. To illustrate, the UE 115 may receive a download file with service SI from a SI service entity directly or via a base station in response to the service SI request. As another example, the UE 115 may, in response to the service SI request, receive the service SI in SI download information at 745 of FIG. 7 or receive the service SI in SI update information at 840 of FIG. 8.

The wireless communication device (e.g., UE or base station) may execute additional blocks (or the wireless communication device may be configured to further perform additional operations) in other implementations. For example, the wireless communication device may perform one or more operations described above, such as described with reference to FIGS. 3A-8. As another example, the wireless communication device may perform one or more aspects as presented below.

In a first aspect, the access SI is broadcast periodically to UEs in idle states, connected states, or both; or the access SI is transmitted in response to an access SI request transmitted by the UE. In some aspects, the access SI request and the service SI request are the same request or included in the same transmission. In other aspects, the service SI request is separate from the access SI request.

In a second aspect, alone or in combination with the first aspect, the service SI request comprises a service SI request for the network device for updated SIB data in response to determining invalid SIB data, and wherein the at least one processor configured to cause the device to receive the particular service SI data includes: receive, in an idle state or a connected state, the updated SIB data for a particular SIB.

In a third aspect, alone or in combination with one or more of the above aspects, the at least one processor configured to cause the device to receive the particular service SI data includes to: receive, in a connected state or an inactive state, SI download information indicating SIB scheduling information, SIB area information, SIB validity information, or a combination thereof, where the SI download information indicates initial SIB information for new SIBs or updated SIB information for existing SIBs.

In a fourth aspect, alone or in combination with one or more of the above aspects, the at least one processor is further configured to cause the device to: receive an SI update indication from the network device indicating updated or modified SI information for one or more SIBs of the SI information.

In a fifth aspect, alone or in combination with one or more of the above aspects, the at least one processor configured to cause the device to receive the particular service SI data includes to: receive the particular service SI data from a second network device, wherein the network device comprises an eDU, and wherein the second network device is a SI service.

In a sixth aspect, alone or in combination with one or more of the above aspects, the network device comprises an eDU, and wherein the particular service SI data includes service SI for one or more services hosted by one or more other network devices (e.g., a third network device, such as a service entity).

In a seventh aspect, alone or in combination with one or more of the above aspects, the at least one processor configured to cause the device to receive the particular service SI data includes to: receive the particular service SI data from the network device, wherein the network device comprises an eDU including an integrated SI service.

In an eighth aspect, alone or in combination with one or more of the above aspects, the network device comprises an eDU, and wherein the particular service SI data includes service SI for one or more services of the eDU.

In a ninth aspect, alone or in combination with one or more of the above aspects, the at least one processor is further configured to cause the device to: receive a SI update indication (e.g., an update for access SI, service SI, or both) from the network device; transmit a second service SI download request to the network device based on the SI update indication, the second service SI download request indicating a request for updated service SI data; and receive the updated service SI data from a second network device.

In a tenth aspect, alone or in combination with one or more of the above aspects, the at least one processor is further configured to cause the device to: receive a SI update indication from the network device; transmit a second service SI download request to the network device based on the SI update indication, the second service SI download request indicating a request for updated service SI data; and receive the updated service SI data from the network device.

In an eleventh aspect, alone or in combination with one or more of the above aspects, the at least one processor is further configured to cause the device to: transition to an idle mode; determine that the access SI has expired; monitor, while in the idle mode, for second access SI (e.g., updated or new access SI) via broadcast transmission; and receive the second access SI in the idle mode.

In a twelfth aspect, alone or in combination with one or more of the above aspects, the at least one processor is further configured to cause the device to: determine that the access SI has expired; transmit a request to the network device for second access SI (e.g., updated or new access SI); and receive the second access SI via unicast message from the network device.

In a thirteenth aspect, alone or in combination with one or more of the above aspects, the at least one processor is further configured to cause the device to: determine that the service SI has expired; transmit a request to the network device for second service SI (e.g., updated or new service SI); and receive the second service SI via unicast message from the network device.

In a fourteenth aspect, alone or in combination with one or more of the above aspects, the at least one processor is further configured to cause the device to: determine that the service SI has expired; monitor, while in a connected mode or an idle mode, for second service SI (e.g., updated or new service SI) via broadcast transmission; and receive the second service SI via the broadcast transmission.

In a fifteenth aspect, alone or in combination with one or more of the above aspects, the at least one processor is further configured to cause the device to: receive a paging DCI indicating access SI update information, service SI update information, or both.

In a sixteenth aspect, alone or in combination with one or more of the above aspects, the at least one processor is further configured to cause the device to: determine which SIBs are subject to an update (e.g., are being, will be, or have been updated) based on the access SI; determine when to monitor for particular SI update data based on a determination of which SIBs are subject to an update (e.g., are being, will be, or have been updated); and receive the particular SI update data based on a determination of when to monitor for the particular SI update data. SIBs may be determined to be subject to update based on a timer or periodically, such as upon expiration of a validity timer or validity time.

In a seventeenth aspect, alone or in combination with one or more of the above aspects, the at least one processor is further configured to cause the device to: receive updated access SI from the network device, wherein the network device comprises an eDU.

In an eighteenth aspect, alone or in combination with one or more of the above aspects, the at least one processor is further configured to cause the device to: determine that a validation time associated with the particular service SI data (e.g., service SI download information) is not valid (e.g., expired or no longer valid); and perform on-demand service SI monitoring for SI service update data in response to the determination that the particular service SI data is not valid.

In a nineteenth aspect, alone or in combination with one or more of the above aspects, the at least one processor is further configured to cause the device to: determine that a validation time associated with the particular service SI data (e.g., service SI download information) is not valid; transmit an on-demand service SI request in response to a determination, based on the validation time, that the particular service SI data is not valid; and receive updated service SI information based on the transmission of the on-demand service SI request.

In a twentieth aspect, alone or in combination with one or more of the above aspects, the at least one processor is further configured to cause the device to: determine whether SI download functionality is supported based on the access SI; and determine to transmit the service SI download request based on a determination that SI download functionality is supported.

In a twenty-first aspect, alone or in combination with one or more of the above aspects, the particular service SI data comprises initial service SI information or service SI update information.

In a twenty-second aspect, alone or in combination with one or more of the above aspects, the service SI request is transmitted in a connected state.

In a twenty-first third, alone or in combination with one or more of the above aspects, the particular service SI data is received in a connected state.

In a twenty-fourth aspect, alone or in combination with one or more of the above aspects, the particular service SI data is received in an inactive state.

In a twenty-fifth aspect, alone or in combination with one or more of the above aspects, the at least one processor is configured to cause the device to, prior to reception of the access SI: transmit an access SI request to the network device; or monitor for an access SI broadcast transmission from the network device (e.g., based on RACH operation). For example, a UE may transmit the access SI request requesting access SI (e.g., second access SI) after receiving previous access SI (e.g., first access SI) during a previous RACH operation. The access SI request from a connected mode or non-connected mode. As another example, the UE may transmit the access SI request requesting access SI (e.g., second access SI) after receiving partial or first access SI during a current RACH operation or from a broadcast message.

In a twenty-sixth aspect, alone or in combination with one or more of the above aspects, wherein the SI download information is received in a transparent container.

Accordingly, wireless communication devices may perform enhanced SI delivery operations. Enhanced SI delivery operations may enable increased flexibility in providing access SI and/or service SI for service-based systems. Enhanced SI delivery operations may enable additional operations for requesting and receiving access SI and/or service SI via different methods and when the receiving device is in different states. Additionally, the increased flexibility in providing access SI and/or service SI may enable additional connection paths and operations modes. Accordingly, the network performance and experience may be increased due to the increased flexibility and efficiency of enhanced SI delivery operations.

Figure 12:
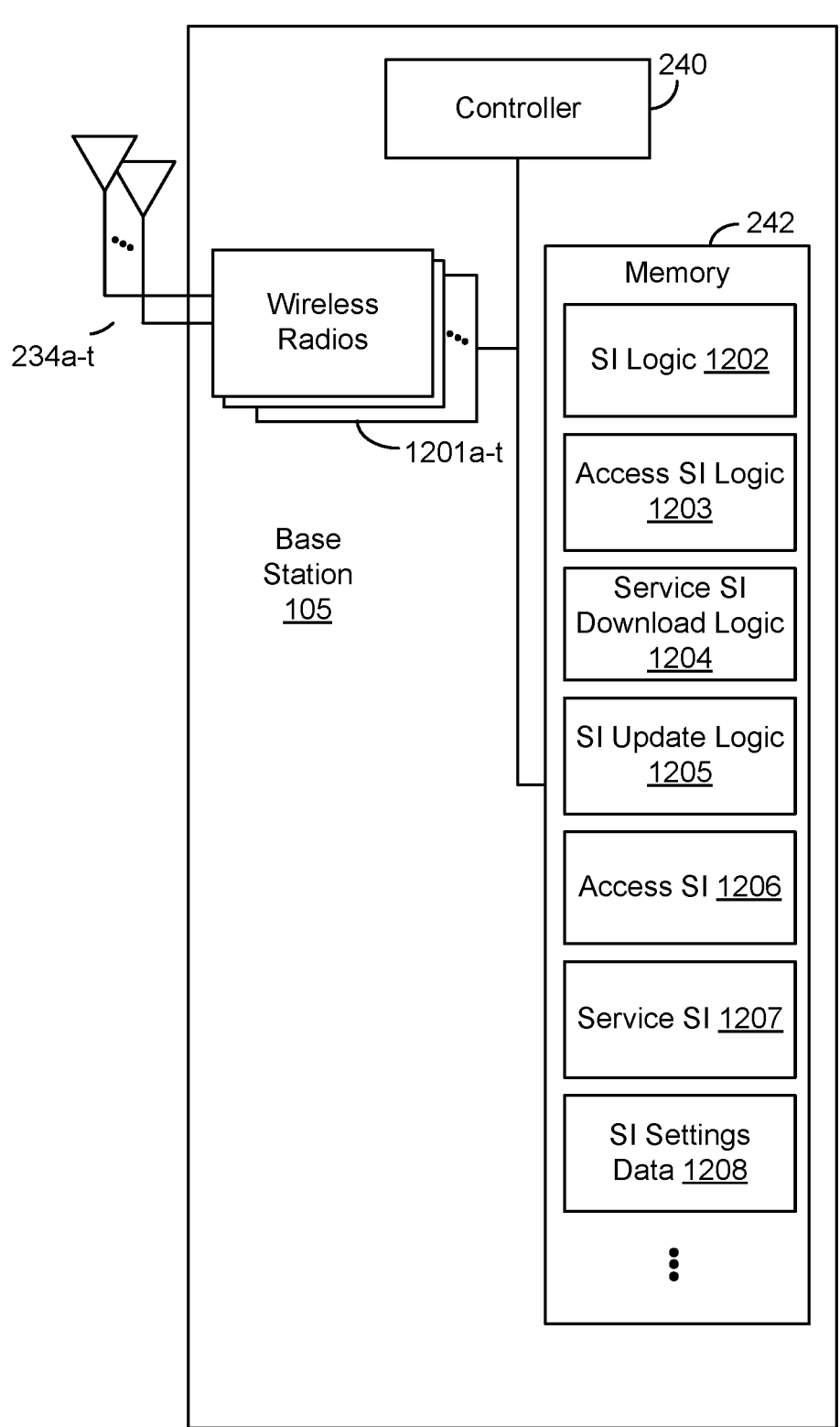
FIG. 12 is a block diagram of an example base station that supports enhanced SI delivery operations according to one or more aspects.

FIG. 10 is a flow diagram 1000 illustrating example blocks executed by a wireless communication device (e.g., a UE or network entity, such as a base station) configured according to an aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of any of FIGS. 2 and 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1201a-t and antennas 234a-t. Wireless radios 1201a-t include various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 12, memory 242 stores one or more of SI logic 1202, access SI logic 1203, service SI download logic 1204, SI update logic 1205, access SI 1206, service SI 1207, or SI settings data 1208. The data (1202-1208) stored in the memory 242 may include or correspond to data and/or logic to enable the operations of FIGS. 4-6.

At block 1002, a wireless communication device, such as a UE or a network device (e.g., a base station 105), transmits access SI to a UE. The access SI may include or correspond to one or more of the access SI information 406 of FIG. 4 or access SI of the access SI transmission 452 of FIG. 4. For example, the base station 105 transmits the access SI information 406 to the UE 115 in the access SI transmission 452 as in FIG. 4. As another example, the base station 105 transmits the access SI information 406 to the UE 115 in an access SI transmission, such as at 725 of FIG. 7, or receives access SI update information in an update transmission, such as at 840 of FIG. 8.

At block 1004, the wireless communication device receives a service SI request based on the transmission of the access SI, the service SI request comprising a service SI download request and indicating a request for particular service SI data. The service SI request may include or correspond to service SI request information or a service SI request, such as in the example of FIG. 6A or 6B. For example, the base station 105 receives a service SI request transmission from the UE 115 as in FIG. 6A or 6B. As another example, the base station 105 may receive a service SI download request transmission from the UE 115, such as at 735 of FIG. 7, or may receive a service SI update request transmission from the UE 115, such as at 830 of FIG. 8. The service SI request may indicate a request for downloading the particular service SI data, such as the service SI download data.

At block 1006, the wireless communication device transmits the particular service SI data, the particular service SI data including one or more SI blocks (SIBs), scheduling information for the one or more SIBs, or both. The transmission may include or correspond to the service SI transmission 454 of FIG. 4, the service SI download transmission of FIG. 6A, or the service SI response of FIG. 6B. The particular service SI data may include or correspond to service SI as in any of FIG. 3A, 4, 5, 6A, 6B, or 7, such as service SI information 408. For example, the base station 105 may transmit the service SI transmission 454 including particular service SI data (e.g., service SI information 408) via a download operation to the UE 115. To illustrate, the base station 105 may transmit, route, or forward a download file with service SI from a SI service entity to the UE 115 in response to the service SI request. As another example, the base station 105 may, in response to the service SI request, transmit the service SI in SI download information to the UE 115 at 745 of FIG. 7, or transmit the service SI in SI update information to the UE 115 at 840 of FIG. 8.

The wireless communication device (e.g., such as a UE or base station) may execute additional blocks (or the wireless communication device may be configured further to perform additional operations) in other implementations. For example, the wireless communication device may perform one or more operations as described with reference to FIGS. 3A-8. As another example, the wireless communication device may perform one or more aspects as described above with reference to FIGS. 7 and 9 or one or more aspects as presented below or in the claims.

In a first aspect, the at least one processor is further configured to cause the device to: receive the particular service SI data from the second network device based on the transmission of the service SI request to the second network device; and transmit the particular service SI data to the UE.

In an additional aspect, a device for wireless communication includes at least one processor and a memory coupled to the at least one processor. The at least one processor is configured to cause the device to: transmit access system information (SI) to a UE; receive a service SI request from the UE based on the transmission of the access SI, the service SI request comprising a service SI download request and indicating a request for particular service SI data; and transmit the particular service SI data to the UE, the particular service SI data including one or more SI blocks (SIBs), scheduling information for the one or more SIBs, or both.

In an additional aspect, a device for wireless communication includes at least one processor and a memory coupled to the at least one processor. The at least one processor is configured to cause the device to: receive a service SI request for a UE and from a network device, the service SI request comprising a service SI download request and indicating a request for particular service SI data; and transmit the particular service SI data to the UE, the particular service SI data including one or more SI blocks (SIBs), scheduling information for the one or more SIBs, or both.

In a second aspect, alone or in combination with one or more of the above aspects, the at least one processor configured to cause the device to transmit the particular service SI data to the UE includes to: transmit the particular service SI data to the network device and indicating the UE as an intended recipient and configured to cause the network device to relay the particular service SI data to the UE.

In a third aspect, alone or in combination with one or more of the above aspects, the at least one processor configured to cause the device to transmit the particular service SI data to the UE includes to: receive particular updated service SI configuration information from a corresponding service; and transmit the updated service SI configuration information to the network device or to the UE.

Accordingly, wireless communication devices may perform enhanced SI delivery operations. Enhanced SI delivery operations may enable increased flexibility in providing access SI and/or service SI for service-based systems. Enhanced SI delivery operations may enable additional operations for requesting and receiving access SI and/or service SI via different methods and when the receiving device is in different states. Additionally, the increased flexibility in providing access SI and/or service SI may enable additional connection paths and operations modes. Accordingly, the network performance and experience may be increased due to the increased flexibility and efficiency of enhanced SI delivery operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device for wireless communication, comprising:
at least one processor; and
a memory coupled to the at least one processor,
wherein the at least one processor is configured to cause the device to:
receive access system information (SI) from a network device;
transmit a service SI request based on the received access SI, the service SI request comprising a service SI download request and indicating a request for particular service SI data; and
receive the particular service SI data from a second network device based on transmission of the service SI request, the particular service SI data including one or more SI blocks (SIBs), scheduling information for the one or more SIBs, or both, wherein the second network device comprises a SI service.

2. The device of claim 1, wherein:
the access SI is broadcast periodically to UEs in idle states, connected states, or both; or
the access SI is transmitted in response to an access SI request transmitted by the UE.

3. The device of claim 1, wherein the service SI request comprises a service SI request for the network device for updated SIB data in response to determining invalid SIB data, and wherein the at least one processor configured to cause the device to receive the particular service SI data includes:
receive, in an idle state or a connected state, the updated SIB data for a particular SIB.

4. The device of claim 1, wherein the at least one processor configured to cause the device to receive the particular service SI data includes to:
receive, in a connected state or an inactive state, SI download information indicating SIB scheduling information, SIB area information, SIB validity information, or a combination thereof, where the SI download information indicates initial SIB information for new SIBs or updated SIB information for existing SIBs.

5. The device of claim 1, wherein the at least one processor is configured to cause the device to:
receive an SI update indication from the network device indicating updated or modified SI information for one or more SIBs of the SI information.

6. The device of claim 1, wherein the at least one processor configured to cause the device to receive the particular service SI data from the second network device includes to:
receive the particular service SI data directly from the second network device; or receive the particular service SI data from the second network device via the network device, wherein the network device comprises an enhanced distributed unit (eDU) configured to route service SI downloads from the second network device.

7. The device of claim 6, wherein the network device comprises an enhanced distributed unit (eDU), and wherein the particular service SI data includes service SI for one or more services hosted by one or more other network devices.

8. The device of claim 1, wherein the at least one processor configured to cause the device to receive the particular service SI data includes to:
    receive the particular service SI data from the network device, wherein the network device comprises an eDU including an integrated SI service.

9. The device of claim 8, wherein the network device comprises an enhanced distributed unit (eDU), and wherein the particular service SI data includes service SI for one or more services of the eDU.

10. The device of claim 1, wherein the at least one processor is configured to cause the device to:
    receive a SI update indication from the network device;
    transmit a second service SI download request to the network device based on the SI update indication, the second service SI download request indicating a request for updated service SI data; and
    receive the updated service SI data from the second network device.

11. The device of claim 1, wherein the at least one processor is configured to cause the device to:
    receive a SI update indication from the network device;
    transmit a second service SI download request to the network device based on the SI update indication, the second service SI download request indicating a request for updated service SI data; and
    receive the updated service SI data from the network device.

12. The device of claim 1, wherein the at least one processor is configured to cause the device to:
    transition to an idle mode;
    determine that the access SI has expired;
    monitor, while in the idle mode, for second access SI via broadcast transmission; and
    receive the second access SI in the idle mode.

13. The device of claim 1, wherein the at least one processor is configured to cause the device to:
    determine that the access SI has expired;
    transmit a request to the network device for second access SI; and
    receive the second access SI via unicast message from the network device.

14. The device of claim 1, wherein the at least one processor is configured to cause the device to:
    determine that the service SI has expired;
    transmit a request to the network device for updated service SI; and
    receive the updated service SI via unicast message from the network device.

15. The device of claim 1, wherein the at least one processor is configured to cause the device to:
    determine that the service SI has expired;
    monitor, while in a connected mode or an idle mode, for second service SI via broadcast transmission; and
    receive the second service SI via the broadcast transmission.

16. The device of claim 1, wherein the at least one processor is configured to cause the device to:

receive a paging DCI indicating access SI update information, service SI update information, or both.

17. The device of claim 1, wherein the at least one processor is configured to cause the device to:
    determine which SIBs are subject to an update based on the access SI;
    determine when to monitor for particular SI update data based on a determination of which SIBs are subject to an update; and
    receive the particular SI update data based on a determination of when to monitor for the particular SI update data.

18. The device of claim 1, wherein the at least one processor is configured to cause the device to:
    receive updated access SI from the network device, wherein the network device comprises an eDU.

19. The device of claim 1, wherein the at least one processor is configured to cause the device to:
    determine that a validation time associated with the particular service SI data is not valid; and
    perform on-demand service SI monitoring for SI service update data in response to the determination that the validation time associated with the particular SI service data is not valid.

20. The device of claim 1, wherein the at least one processor is configured to cause the device to:
    determine that a validation time associated with the particular service SI data is not valid;
    transmit an on-demand service SI request in response to the determination that the validation time associated with the particular SI service data is not valid; and
    receive updated service SI information based on the transmission of the on-demand service SI request.

21. The device of claim 1, wherein the at least one processor is configured to cause the device to:
    determine whether SI download functionality is supported based on the access SI; and
    determine to transmit the service SI download request based on a determination that SI download functionality is supported.

22. The device of claim 1, wherein the particular service SI data comprises initial service SI information or service SI update information.

23. The device of claim 1, wherein the service SI request is transmitted in a connected state.

24. The device of claim 1, wherein the at least one processor is configured to cause the device to, prior to reception of the access SI:
    transmit an access SI request to the network device; or
    monitor for an access SI broadcast transmission from the network device.

25. A device for wireless communication, comprising:
    at least one processor; and
    a memory coupled to the at least one processor,
    wherein the at least one processor is configured to cause the device to:
    transmit access system information (SI) to a UE;
    receive a service SI request from the UE based on the transmission of the access SI, the service SI request comprising a service SI download request and indicating a request for particular service SI data; and
    transmit the service SI request to a second network device, wherein transmission of the service SI request enables a service SI download of the particular service SI data for the UE, the particular service SI data including one or more SI blocks (SIBs), scheduling information for the one or more SIBs, or both, wherein the second network device comprises a SI service.

26. The device of claim 25, wherein the at least one processor is configured to cause the device to:

receive the particular service SI data from the second network device based on the transmission of the service SI request to the second network device; and transmit the particular service SI data to the UE.

27. A device for wireless communication, comprising:

at least one processor; and a memory coupled to the at least one processor, wherein the at least one processor is configured to cause the device to:

transmit access system information (SI) to a UE;

receive a service SI request from the UE based on the transmission of the access SI, the service SI request comprising a service SI download request and indicating a request for particular service SI data; and transmit the particular service SI data to the UE, the particular service SI data including one or more SI blocks (SIBs), scheduling information for the one or more SIBs, or both, wherein the particular service SI data is received from a SI service.

28. A device for wireless communication, comprising:

at least one processor; and a memory coupled to the at least one processor, wherein the at least one processor is configured to cause the device to:

receive, at a (system information) SI service, a service SI request for a UE and from a network device, the service SI request comprising a service SI download request and indicating a request for particular service SI data; and transmit, from the SI service, the particular service SI data to the UE, the particular service SI data including one or more SI blocks (SIBs), scheduling information for the one or more SIBs, or both.

29. The device of claim 28, wherein the at least one processor configured to cause the device to transmit the particular service SI data to the UE includes to:

transmit the particular service SI data to the network device and indicating the UE as an intended recipient and configured to cause the network device to relay the particular service SI data to the UE.

30. The device of claim 28, wherein the at least one processor configured to cause the device to transmit the particular service SI data to the UE includes to:

receive particular updated service SI configuration information from a corresponding service; and transmit the updated service SI configuration information to the network device or to the UE.

* * * * *